(12) United States Patent
Bushen

(10) Patent No.: US 8,996,817 B2
(45) Date of Patent: Mar. 31, 2015

(54) MEMORY ACCESS SYSTEM

(75) Inventor: Kirk I. Bushen, Tewksbury, MA (US)

(73) Assignee: Harman International Industries, Inc., Northridge, CA (US)

(*) Notice: Subject to any disclaimer, the term of this patent is extended or adjusted under 35 U.S.C. 154(b) by 210 days.

(21) Appl. No.: 13/547,278

(22) Filed: Jul. 12, 2012

(65) Prior Publication Data

US 2014/0019703 A1     Jan. 16, 2014

(51) Int. Cl.
*G06F 12/00*     (2006.01)
*G06F 13/16*     (2006.01)

(52) U.S. Cl.
CPC .................................... *G06F 13/16* (2013.01)
USPC ............................................ 711/138; 710/18

(58) Field of Classification Search
CPC ............................... G06F 5/06; G06F 3/0656
USPC ..................................... 711/167, 138; 710/18
See application file for complete search history.

(56) References Cited

U.S. PATENT DOCUMENTS

2004/0158677 A1* 8/2004 Dodd ............................ 711/118

OTHER PUBLICATIONS

Texas Instruments, Nov. 2005, "TMS320C6713 Floating-Point Digital Signal Processor." (148 pages).
Texas Instruments, Nov. 2005, Application Report "How to Create Delay-based Audio Effects on the TMS320C672x DSP." (36 pages).
Analog Devices, The World Leader in High Performance Signal Processing Solutions, Posted Mar. 29, 2011, "External Port DMA Engine for 2137x." (20 pages).
ADSP—21375, Posted Mar. 29, 2011, "External DMA Scatter/Gather Example." Engine Zone. (2 pages).
Analog Devices, Revision 2.1, May 2010, Part No. 82-000100-01, "ADSP-2137x SHARC Processor Hardware Reference, Includes ADSP-21367, ADSP-21368, ADSP-21369, ADSP-21371, ADSP-21375" (882 pages).
Analog Devices, Revision 0.3, Jul. 27, 2010, Part No. 82-000469-01, "ADSP-214xx Sharc Processor Hardware Reference, Includes ADSP-2146x, ADSP-2147X, ADSP-2148X Product Families." (1,192 pages).
Analog Devices, Revision 1.0, Feb. 2012, Part No. 82-000469-01, "ADSP-214xx Sharc Processor Hardware Reference, Includes ADSP-2146x, ADSP-2147x, ADSP-2148x." (1,276 pages).

* cited by examiner

Primary Examiner — Kalpit Parikh
(74) Attorney, Agent, or Firm — Brooks Kushman P.C.

(57) ABSTRACT

A memory access system may be used to relay data between an electronic device and external memory. The memory access system may include write buffers which may receive and write information from the electronic device to the external memory. The memory access system may also include read buffers which may gather data from the external memory and send it to a main processing component of the electronic device for processing. The memory access system may be configured so that the main processing component of the electronic device may gather data from the write buffers of the memory access system when a condition is satisfied.

20 Claims, 18 Drawing Sheets

Cycle = Z+3 (Early)
Delay Index <= 2*N-1

MEMORY ACCESS SYSTEM

BACKGROUND OF THE INVENTION

1. Technical Field

This disclosure generally relates to a memory access system. More specifically, this disclosure relates to systems and methods (generally referred to as systems) with or using a memory access system while performing signal processing.

2. Related Art

Processors may use or require large amounts of memory when performing some processes. For example, an electronic device or chip may use memory external to the device or chip for storing data and information. A memory access component may be used to transform information between the device or chip and the memory external to the device or chip.

SUMMARY

A memory access system may be used to transmit or relay data between an electronic device and external memory. The memory access system may include a write buffer component with one or more write buffers that may receive and write information from the electronic device to the external memory. The memory access system may also include a read buffer component with one or more read buffers which may gather data from the external memory and send it to a processor of the electronic device for processing. The memory access system may be configured so that when a delay index of data being transmitted to and from the external memory is less than a threshold value, the processor of the electronic device may gather data from one of the write buffers in the write buffer component of the memory access system.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
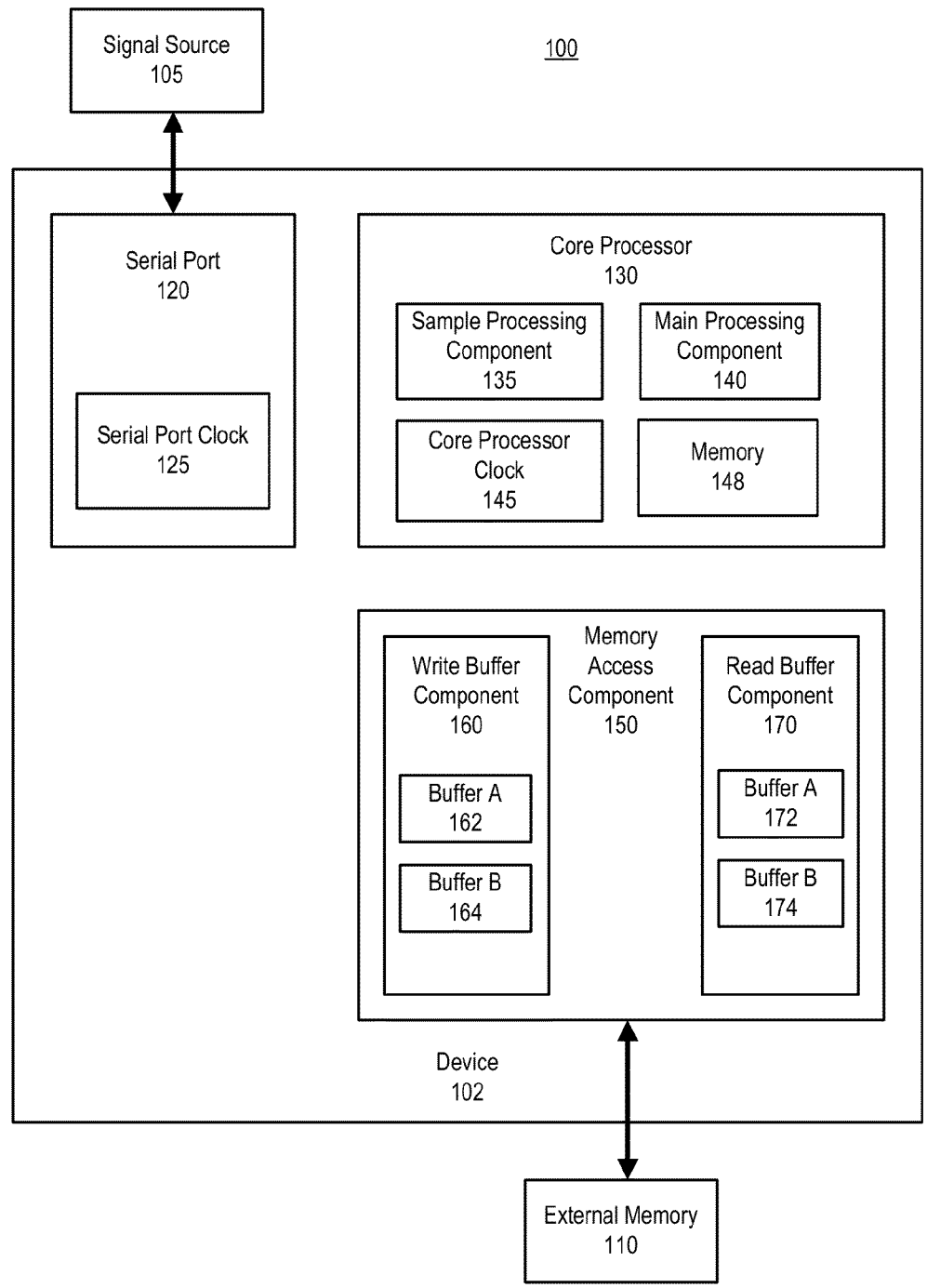
FIG. 1 is a block diagram of an example electronic device network.

FIG. 1 shows an example electronic device network 100. The network 100 may include one or more electronic devices 102. The network 100 may additionally or alternatively include one or more signal sources 105 and external memory 110.

The electronic device 102 may receive a signal, data, or other information ("signal") from a signal source 105. In systems where the signal source 105 transmits a signal, the signal may have a frequency. For example, a signal source 105 may be an audio signal source which may transmit an audio signal having a frequency of 44.1 kHz. In other examples, the signal source 105 may transmit various other signals having various other frequencies. In still other examples, the signal source 105 may transfer data or information to the electronic device, such as where the signal source 105 is a memory or database distinct from the electronic device. The signal source 105 may or may not exist externally from the electronic device 102. In some instances, the signal source 105 may be an internal signal source, or may be an internal signal source mixed with an external signal source. Various other signal sources 105 are possible.

The electronic device 102 may receive the signal from the signal source 105 in various ways. For example, the electronic device 102 may include a serial port 120 that may communicate with or otherwise be connected to the signal source 105. The serial port 120 may receive a signal from the signal source 105. The serial port 120 may include one or more serial port clocks 125.

The serial port 120 may gather, generate, or create samples from the signal received by the signal source 105. For example, the serial port 120 may generate or gather digital samples from an audio signal received from the signal source 105. The serial port 120 may transmit, send, or otherwise pass the gathered, generated, or created samples to one or more other components of the electronic device 102, such as to a core processor 130.

In some systems, the serial port 120 may be configured to gather, generate, or create a number of samples ("N samples") before sending the samples to another component of the electronic device 102. The samples in each set of samples may be contiguous data items, for example. Each set of N samples gathered and sent to one or more components of the electronic device 102 during a clock cycle or period of time may be referred to as a sample burst or sample block. The burst size may, for example, be equal to N, or the size of the set of samples gathered in a sampled burst, or may be various other values.

The size of the frame, sample burst or sample block (which may be referred to as a burst size, a frame size, or a batch size) may be configurable or set by a programmer or may be set automatically by a processor or controller of the electronic device 102. An example of a sample burst size or sample block size may be 8 samples, 16 samples, 32 samples, or various other sample sizes. A burst size may be or represent a tradeoff between how much internal memory may be available within a core processor 130 and how often the device 102 may wish to switch or transfer present data for the next set of data. Other variations and configurations are possible.

The serial port 120 may be configured or operable to send the gathered set of N samples to a processing component of the electronic device 102 in accordance with a time period or time interval. A time period or time interval used or necessary to gather and generate a set of N samples and transmit those samples to one or more components of the electronic device 102 may be referred to as a clock cycle, burst cycle, sample cycle, or batch cycle. The clock cycle may be controlled or measured by the serial port clock 125. The length of a clock cycle may depend on the number of samples to be collected for each sample burst or sample block.

In other systems, the electronic device 102 may not include a serial port 120, and one or more components may be used receive or gather samples, data, or information from one or more on-device or off-device components. For example, one or more other components may be used by the electronic device 102 to receive a signal from the signal source 105 and gather or generate one or more samples to be sent to a core processor 130. Other variations are possible.

The electronic device 102 may also or alternatively include one or more core processors 130. The core processor 130 may be or represent one or more digital signal processor ("DSP"), analog processor or chip, processing chip, other physical processor, field programmable gate array ("FPGA"), and/or other integrated circuit. The core processor 130 may include one or more processing components, such as a sample processing component 135 and a main processing component 140. In some systems, the sample processing component 135 and the main processing component 140 may be different components or devices. In other systems, the sample processing component 135 and the main processing component 140 may be the same component or device.

The sample processing component 135 may be configured or operable to processing data, such as one or more samples, received by the core processor 130. For example, the sample processing component 135 may receive audio samples from the serial port 120 of the electronic device 102, and may perform an initial, preliminary, filtering, or other first processing of the samples. As an example, the sample processing component 130 may be programmed with an algorithm, code or logic to apply one or more filters to samples received from the serial port 120, or may perform various other processing of data.

The sample processing component 135 may perform pre-processing on the data to be written to the delay line. In some instances, the sample processing component 135 may be referred to as pre-processing. This pre-processing may include signal processing such as Logic7, Quantum Logic™, or various other signal processing. As another example, sample processing component 135 may be used to combine, mix, synthesize, filter, up-sample, down-sample, de-noise, or otherwise process a signal or data received by the device 102. Additionally or alternatively, the sample processing component may generate and mix externally generated signals. Various other examples are possible.

The main processing component 140 of the core processor 130 may receive data or information and may perform one or more processes on the received data or information for the core processor 130. As an example, the main processing component 140 may be programmed with an algorithm, code or logic to perform one or more signal processing functions or algorithms, such as an echo algorithm, a reverberation algorithm, Quantum Logic, or other audio signal processing functions on a set of data. The main processing component 140 may additionally or alternatively perform various other analyses, functions, algorithms or processing. The main processing component 140 may perform post-processing on the data that is read from a delay line, and may be referred to as post-processing. Other variations are possible.

In some systems, the data or information received and processed by the main processing component 140 may be or include data which has already been received and processed by the sample processing component 135. As an example, the main processing component 140 may receive data from a memory access component 150 connected with an external memory 110. The data received may include data previously processed by the sample processing component 135.

The main processing component 140 may additionally be connected to or in communication with one or more off-device components, such as various other external memory locations or output devices. The main processing component 140 may additionally or alternatively be connected with one or more additional memory access components which may write data or samples processed by the main processing component 140 to the one or more off-device components. Samples or data processed by the main processing component 140 may be sent or transmitted to the one or more off-device components when the main processing component 140 has completed at least part of the processing of those samples or data. Other examples are possible.

The core processor 130 may also or alternatively include a core processor clock 145. The core processor clock 145 may be configured or operable to control one or more functions of the core processor 130. For example, the core processor clock 145 may control a rate or speed at which a sample processing component 135 may process samples received from the serial port 120. The core processor clock 145 may also or additionally control one or more parameters of the processing or analysis performed by the main processing component 140.

Any or each of the sample processing component 135, the main processing component 140, the core processor clock 145, or various other components of the core processor 130 may be or include hardware, software, or a combination of both. For example, any of the sample processing component 135, the main processing component 140, the core processor clock 145, or various other components of the core processor 130, may represent hardware or hardware accelerator blocks that may be used for performing one or more processes, computations, calculations, algorithms, or other manipulations or for running software, code, or other logic. For example, the main processing component 140 may perform core logic functions, such as Quantum Logic™, or the application of other surround sound algorithms. As another example, main processing component 140 may be used to combine, mix, synthesize, filter, up-sample, down-sample, de-noise, or otherwise process a signal or data received by the device 102. Various other examples are possible.

The core processor 130 may also or alternatively include memory 148, such as internal fast memory. Memory 148 may be or include dynamic random-access memory ("DRAM"), content addressable memory, cache memory, internal random-access memory ("RAM"), and/or various other types of internal fast memory. Memory 148, such as internal RAM, may have an asynchronous interface, which may allow the fast memory 148 to respond as quickly as possible to changes in control inputs. Memory 148 may be small and limited by a size of the core processor 130. Memory 148 may be used to store data that the core processor 130 is performing one or more functions on, but may not be capable of meeting large storage demands.

The device 102 may include one or more memory access components 150. The memory access component 150 may be configured or operable to connect or communicate with the core processor 130 and external memory 110. The memory access component 150 may, for example, be a direct memory access ("DMA") component, such as an external port DMA, or various other memory access components.

The memory access component 150 may facilitate a transfer and relay of data or information, such as samples, between the core processor 130 and external memory 110. For example, the memory access component 150 may include one or more write buffer components 160, which may be accessed and used by the core processor 130 to write data from the core processor 130 to the external memory 110. As a specific example, the core processor 130 may use the write buffer component 160 to write data previously processed by the sample processing component 135 to the external memory 110.

The memory access component 150 may also or alternatively include one or more read buffer component 170, which may be accessed and used by the core processor 130 to gather or read data from the external memory 110 to the core processor 130. As a specific example, the core processor 130 may use the read buffer component 170 to gather or access data previously processed by the sample processing component 135 and stored in the external memory 110 for use in further processing or analysis by the main processing component 140. The read buffer component 170 may gather data that was recently stored in external memory 110, such as data that was stored in a previous clock cycle, or may gather data that was stored at various other times, such as at any period or clock cycle earlier. Though only one set of read buffer components 170 are shown in electronic device 102, in other systems or examples, multiple read buffer components 170 may be implemented or used.

External memory 110 for use with a core processor 130 or the electronic device 102 may, for example, be or include synchronous dynamic random-access memory ("SDRAM") memory, double data rate synchronous dynamic random access memory ("DDR SDRAM," "DDR," or "DDR memory"), static random-access memory ("SRAM"), or other memory which may be separate from and accessible to the device 102 or core processor 130. In some systems, the addresses of external memory 110 may be configured to always increment, or alternatively to always decrement. The memory access component 150 may be or provide an interface between the device 102 or core processor 130 and the external memory 110, allowing the core processor 130 to access and use data, information, code, or logic stored within the external memory 110.

Part or all of the memory on or accessible to the device, such as the memory 148 and external memory 110, may be used to store one or more of data, information, code, or logic. Various hardware components or other computing modules, such as one or more components of the core processor 130, may access code or logic stored in memory on or accessible to the core processor 130 which may include instructions for performing one or more processes, computations, calculations, or algorithms. The hardware and computing modules may also or alternatively use signals or data stored in memory as inputs upon which to perform one or more processes, computations, calculations, or algorithms. The hardware and computing modules may store data or other information in memory on or accessible to the core processor 130 before, during, or after processing, calculating, or performing other manipulations various signals or data.

The device 102, or one or more components within the device 102 or external to the device 102 (such as the signal source 105 or external memory 110), may communicate internally or with other components within the device 102 in various ways, such as by or through wired or wireless communication links, by or using a communication bus interconnecting one or more components of the device 102, or through various other communication links or lines. Additional or fewer components may be possible.

In other examples, the components illustrated in the device 102 may be external or included in one or more separate integrated circuits or chips that form the device 102. In other systems, the device 102 may also or alternatively directly include external memory 110 within the device.

In some instances, data such as samples processed by the core processor 130 or transferred between the core processor 130 and the external memory 110 may include or be associated with one or more delays, delay lines, or delay indexes ("delay index").

The delay indexes may represent a time delay of a digital delay line or digital delay index that may be set to allow a signal to be delayed by a number of samples. A delay index may refer to a distance between location of a write sample and a location of a read sample in a delay line buffer. A finer resolution delay may occur between two read samples using a method such as interpolation. These two indexes may be obtained via the techniques herein, but the specific method of interpolation is beyond the scope of the invention. Such delay lines or delay indexing may be used, for example, as building blocks in methods performed by a processor to mimic, simulate or calculate room acoustics, musical instruments, audio reflections, digital audio effects, or various other effects. As an example, delay indexing may be used to delay some samples in associate with an estimated or anticipated delay of a signal or sound wave associated with the samples, such as a delay from echoes or reverberations of a signal. As another example, digital delay lines may be used as sound synthesis methods for various musical instruments. Other examples and variations are possible. The first sample of a batch may be identified using a delay index, and each subsequent sample of a batch may be sequentially identified from the first sample. For example, one or more processing components may gather samples, a first sample according to a delay index, and seven samples contiguously or sequentially from the first sample.

A programmer or algorithm generator may determine or set a single or multiple delay lines or delay indexes. In other systems, a program or function performed by the core processor 130, algorithm, or another processing component may automatically set a delay line or delay index, such as based on one or more decisions or factors. As an example, code or logic may be programmed with or into one or more processors, algorithms, processing components to determine or create a delay line or delay index.

Delay indexing of samples may control or otherwise affect transfers of data between the core processor 130 and external memory 110. For example, a determination of which samples are gathered by the read buffer component 170 may depend on a delay line or delay index of samples set by an algorithm.

Where a delay line or delay index is large, the samples gathered by the read buffer component 170 may have been stored in the external memory 110 many cycles earlier. Conversely, when a delay line or delay index which is small, such as less than 2 times a burst size, the samples gathered by the read buffer component 170 may include samples which were just recently stored in the external memory 110, such as within 2 clock cycles. Other variations and examples are possible.

Figure 2:
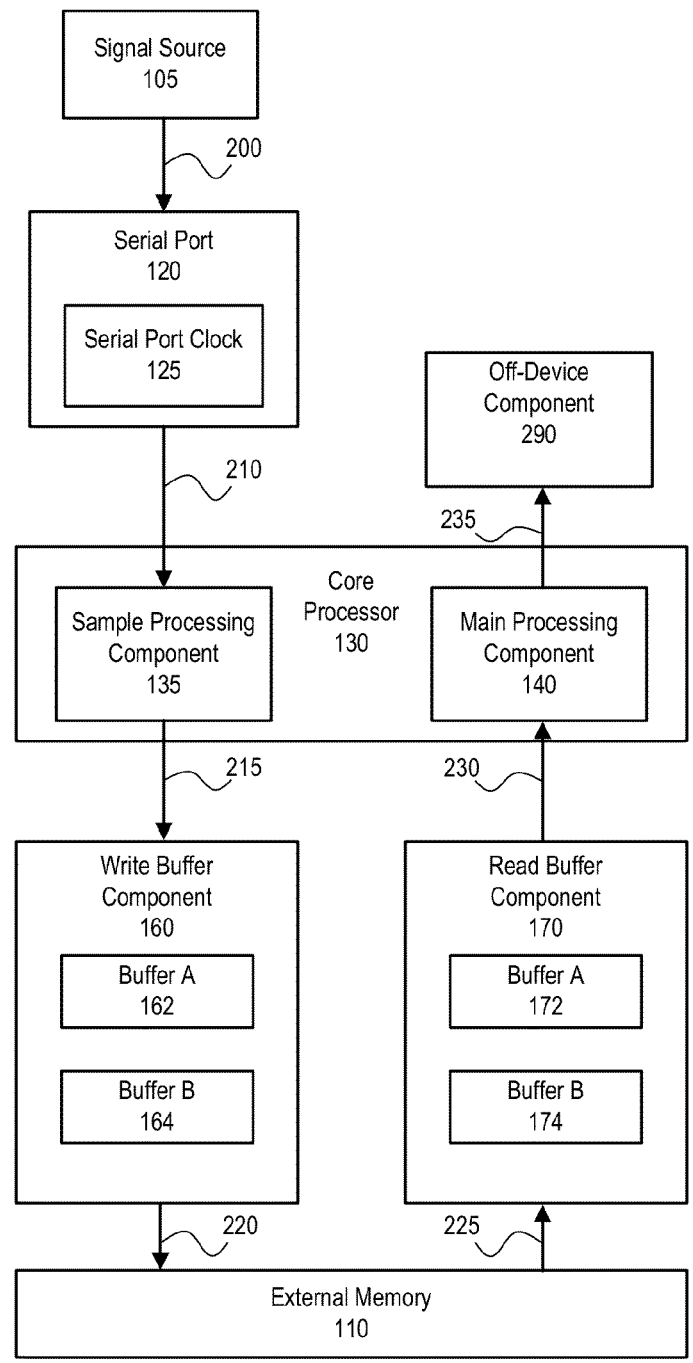
FIG. 2 is a block diagram of an example operation of an electronic device.

FIG. 2 shows an example of how the components of the device 102 may operate in the electronic device network 100. For example, the signal source 105 may transmit or send a signal 200. The signal 200 may be an analog or digital signal, data, or other information. The signal 200 may be sent continuously, periodically, at intervals, or at various other times. The signal 200 may or may not have a frequency. The signal 200 may be or include data or information. Other variations are possible.

The serial port 120 may receive the signal 200. Where the signal 200 is an analog or digital signal, the serial port 120 may gather, generate, or create data such as one or more samples, data points, or other information ("samples") for the signal 200. The serial port 120 may gather, generate, or create a new set of samples during each clock cycle. For example, the serial port 120 may gather, generate, or create a set of samples during a first clock cycle ("Z"). The serial port 120 may transmit, send, or otherwise relay the gathered samples 210 to the core processor 130 at the end of the first clock cycle Z or when the next clock cycle ("Z+1") occurs. The serial port 120 may continually receive and generate samples during each subsequent clock cycle, and may transmit them to the core processor 130 at the end of each clock cycle or at the beginning of each subsequent clock cycle.

The samples 210 from the serial port 120 may be received or accessed by one or more components of the core processor 130. For example, the samples 210 may be sent to or received by the sample processing component 135 of the core processor 130 at the end of the clock cycle Z or at the beginning of the clock cycle Z+1, before the DMA process for the Z+1 cycle has started. The sample processing component 135 may perform one or more functions, processes, analysis, or other tasks on the one or more samples 210 during the second clock cycle Z+1. For example, the sample processing component 135 may apply one or more filters, such as a low pass filter, to the samples 210. Other functions, timing, and variations are possible.

The samples processed by the sample processing component 135 (sometimes referred to as filtered samples, pre-processed samples, initially processed samples, or previously processed samples) during the Z+1 clock cycle may be written to or with the write buffer component 160 as initially processed samples 215. For example, the processed samples 215 may be written to one or more of the buffers of the write buffer component 160, such as to write buffer A 162. The processed samples 215 may be written to or with the write buffer component 160 at various times, such as during the second clock cycle Z+1 as the samples are processed, at the end of the second clock cycle Z+1 after the samples have all been processed, or at the beginning of a third clock cycle Z+2 before the DMA process for the Z+2 clock cycle has started. Other variations are possible.

During an early, initial, beginning, or first phase of the third clock cycle Z+2, the initially processed samples 215 of the Z+1 clock cycle may be transmitted, written, sent, or otherwise relayed by the write buffer component 160 to the external memory as written samples 220. For example, a buffer such as buffer A 162 may transfer data stored in the buffer A 162 from the sample processing component 135 to the external memory 110. In some instances, the transfer of data performed by the write buffer component 160 may be initiated at the start of the new clock cycle, such as by a signal or communication received from one or more processor or control unit.

During a late phase of the third clock cycle Z+2, after the write buffer component 160 has transmitted the written samples 220 to the external memory 110, the read buffer component 170 may be configured or used to access data from the external memory 110 for use with the core processor 130. For example, one or more buffer from the read buffer component 170, such as buffer A 172, may gather read samples 225 stored in the external memory 110 to be subsequently used by the main processing component 140. The read samples 225 gathered by the read buffer component 170 may be identified or determined by a delay line or delay index. Where a delay line or delay index is between twice a burst size and thrice a burst size, the read samples 225 may be the written samples 220 that were written during an initial or early phase of the third clock cycle Z+2. Where the delay index is greater than three times a burst size, the read samples 225 may be samples that were written as written samples 220 in an earlier clock cycle, or other data or information stored in the external memory 110. Other variations are possible.

During a fourth clock cycle Z+3, the read buffer component 170 may transmit or otherwise send the read samples 225 that it gathered during the Z+2 clock cycle to the core processor 130 as buffered samples 230. One or more components of the core processor 130, such as the main processing component 140, may access or receive the buffered samples 230. In some instances, the transfer of the buffered samples 230 to the core processor 130 may take place or be initialized by the start of a clock cycle or a signal from one or more processor or control unit. Other variations are possible.

Once received, the main processing component 140 may proceed to process the buffered samples 230. The main processing component 140 may process the buffered samples 230 immediately upon receipt or during subsequent clock cycles. When the main processing component 140 has finished processing the buffered samples 230, the main processing component 140 may transfer, transmit, or otherwise send the processed samples 235 to one or more off-device components 290.

Each of the components, such as the signal source 105, the serial port 120, the core processor 130, the write buffer component 160, the read buffer component 170, and the external memory 110 may continue to operate in a similar fashion through each subsequent clock cycle. For example, the serial port 120 may continue to gather, generate, or otherwise create samples during each clock cycle, and may continue to pass the gathered samples 210 to the core processor 130 before the end of each clock cycle transmission or before the beginning of each subsequent clock cycle transition. As another example, the sample processing component 135 may continue to process the gathered samples 210 during each subsequent clock cycle and transmit the initially processed samples 215 to the write buffer component 160.

In transferring data or samples from the core processor 130 to the external memory 110 over a number of clock cycles, the write buffer component 160 may operate in an alternating fashion. The write buffer component 160 may include one or more buffers, such as buffer A 162 and buffer B 164, and may alternate between writing using the buffer A 162 and the buffer B 164 during subsequent clock cycles. For example, during the an initial clock cycle (such as clock cycle Z+1), a first set of information from the core processor 130, such as the first set of pre-processed samples 215, may be written into a first buffer A 162 of the write buffer component 160 by the core processor 130. During a next time period or cycle (Z+2), this first set of information previously written into the first buffer A 162 of the write buffer component 160 may be written in or otherwise transferred to the external memory 110, while a new set of pre-processed samples from the sample processing component 135 (such as samples processed by the sample processing component 135 during the current Z+2 cycle) may be written into the second buffer B 164. During a next period or cycle (Z+3), the information written into buffer B 164 during the previous cycle (Z+2) may be written into the external memory 110, while a new set of pre-processed samples that are processed by the sampling component 135 during the current clock cycle (Z+2) may be written into the first buffer A 162, overwriting the first set of samples in the buffer. This ping-pong or A-B buffering may be one example of a method or configuration used by the write buffer component 160 to communicate and transfer data or information from the core processor 130 to the external memory 110. Other variations are possible.

The read buffer component 170 may also or alternatively communicate or transfer data from the external memory 110 to the core processor 130 in an alternating or ping-pong way. The read buffer component 170 may include one or more buffers, such as buffer A 172 and buffer B 174. During a first time period or cycle, a first set of information from the external memory 110, such as a first set of samples to be processed by the main processing component 140, may be written into a first buffer A 172 of the read buffer component 170. During a next time period or cycle, this first set of information previously written into the first buffer A 172 of the read buffer component 170 may be accessed by or otherwise transferred to the core processor 130. During this same second period or cycle, a new set of samples to be processed by the main processing component 140 may be written from the external memory 110 into the second buffer B 174. During a third period or cycle, the information written into buffer B 174 during the previous cycle may be accessed by or transferred to the main processing component 140, while a new set of samples to be processed by the main processing component 140 may be written from the external memory 110 into the first buffer A 172, overwriting the first set of samples. This ping-pong or A-B buffering may be one example of a method or configuration used by the read buffer component 170 to communicate data or information from the external memory 110 to the core processor 130. Other variations of the operation of the write buffer component 160 or read buffer component 170 are possible.

Figure 3:
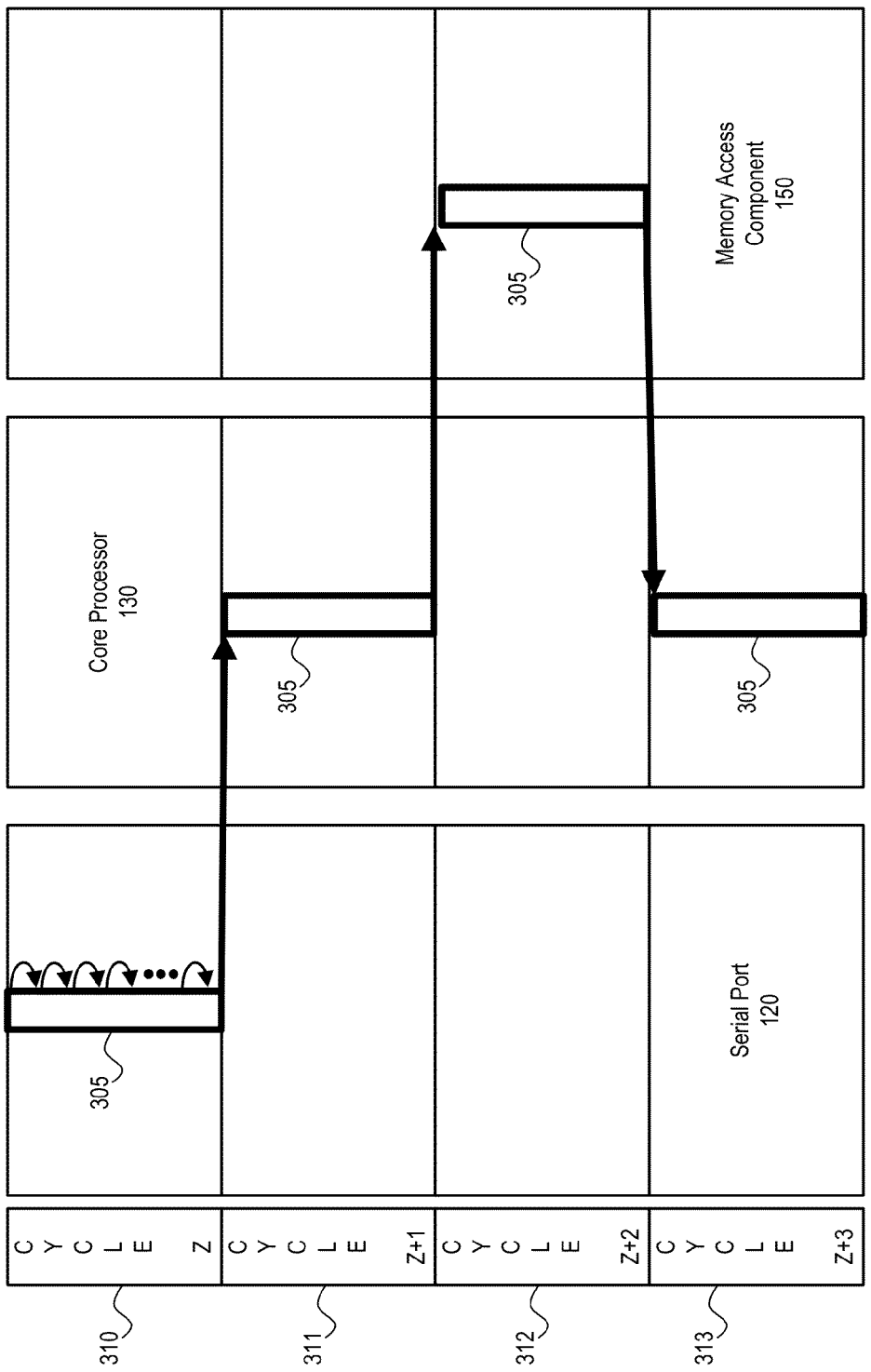
FIG. 3 is a flow diagram of an example operation of an electronic device.

FIG. 3 shows a timeline of how one particular set of N samples, or sample burst 305, may be processed and passed through one or more components of the device 102. The sample burst 305 in FIG. 3 may have or be associated with a delay index that is 0 based and is directly related to N.

During a first clock cycle 310 (Z), the serial port 120 may gather or generate one or more samples as part of a sample burst 305. For example, the serial port 120 may gather N samples, each sample gathered at a regular interval such as f, where f may be a frequency of the signal received from the signal source 105. In this example, the composite sample burst may be gathered at a regular interval of N/f. Other examples are possible.

Before the end of the first clock cycle 310, the serial port 120 may transmit, transfer, or otherwise pass the sample burst 305 to the core processor 130. For example, the sample burst 305 may be passed to a sample processing component 135 to be processed during the second clock cycle 311 (Z+1). The sample burst 305 sent from the serial port 120 may be ready for processing by the core processor 130.

During the clock cycle 311 (Z+1), the sample burst 305 may be processed by the core processor 130. For example, the sample processing component 135 may perform one or more pre-processing functions or algorithms, such as applying a low pass filter and accounting for or identifying a delay line or delay index of the sample burst 305. The sample burst 305 may be processed by the sample processing component 135 at various times or intervals. For example, the sample processing component 135 may process the sample burst 305 at a regular interval which may be the same or a similar interval at which the sample burst 305 were gathered by the serial port 120, such as N/f. Other processing may be performed by the sample processing component 135.

As the sample burst 305 is being processed continuously throughout the clock cycle 311 (Z+1), the processed sample burst 305 may be transmitted or written to a write buffer component 160. Alternatively, after the sample burst 305 has been processed before the end of the clock cycle 311 (Z+1), the processed sample burst 305 may be written to the write buffer component 160.

At the start of the next clock cycle 312 (Z+2), the write buffer component 160 may transfer or write the processed sample burst 305 to the external memory 110. The write buffer component 160 may write all of the processed sample burst 305 during an early or initial phase or stage of the clock cycle 312 (Z+2).

Once the write buffer component 160 has written the processed sample burst 305 to the external memory 110, the read buffer component 170 may gather samples from the external memory 110. Because in this case the delay index of the sample burst 305 is between 2*N, the N samples gathered by the read buffer component 170 during the clock cycle 312 (Z+2) may be the sample burst or a pre-processed version of sample burst 305. In other systems or where the delay index is greater than 2*N−1, the gathered sample burst may be various other samples.

The read buffer component 170 may gather sample burst 305 from the external memory 110 during a late, subsequent, or end stage or phase of the clock cycle 312 (Z+2). The late, subsequent, or end stage or phase of the clock cycle 312 (Z+2) may be after the initial or early stage or phase of the clock cycle 312 (Z+2), and may be triggered by an end of the initial or early stage or phase, such as when the write buffer component 160 has completed writing the sample burst 305 to the external memory 110. For example, the read buffer component 170 may be automatically triggered to gather samples when the write buffer component 160 has finished writing samples to the external memory 110 during the clock cycle.

At the beginning of the clock cycle 313 (Z+3), the gathered samples 305 may be transmitted or sent back to the core processor 130 by or through the use of the read buffer component 170. For example, the gathered sample burst 305 may be transmitted or sent to a main processing component 140 of the core processor 130 for further processing.

In these examples, only after the sample burst 305 has been written to the external memory 110 can the core processor 130 access the pre-processed samples 305 from the external memory 110 using the read buffer component 170 for further processing. As such, a sample that is processed by the sample processing component 135 may take 2*N+1 samples to propagate through the write buffer component 160, external memory 110, and read buffer component 170 back to the core processor 130. Only at the start of the fourth clock cycle 313 (Z+3), and two clock cycles after the core processor preprocessed the samples 305, can the samples 305 be accessed from external memory 110 using the read buffer component 170.

Accordingly, where a delay index of a set of samples is set to be greater or equal to a threshold value (such as 2*N), processing samples transmitted with the read buffer component 170 of device 102 may be appropriate. In such cases, the memory access component 150 of the device 102 will have time to receive all of the pre-processed samples 215 from the core processor 130, write the samples to the external memory 110 with a write buffer component 160, gather the written samples from the external memory 110, and send the gathered samples to the core processor 130 with a read buffer component 170. However, this procedure may take two cycles for the memory access component 150 to perform these steps.

In some instances, however, a delay index may be set to be less than or equal to a threshold value. For example, a delay index may be set or programmed to be less than or equal to 2*N−1. In this instance, the memory access component 150 may not be able to write pre-processed samples to the external memory 110 and then gather the pre-processed samples for the core processor 130. As such, the core processor 130 may not be able to use the read buffer component 170 to access and process sample bursts 305 that have a delay index of less than or equal to the threshold value, such as 2*N−1.

Figure 4:
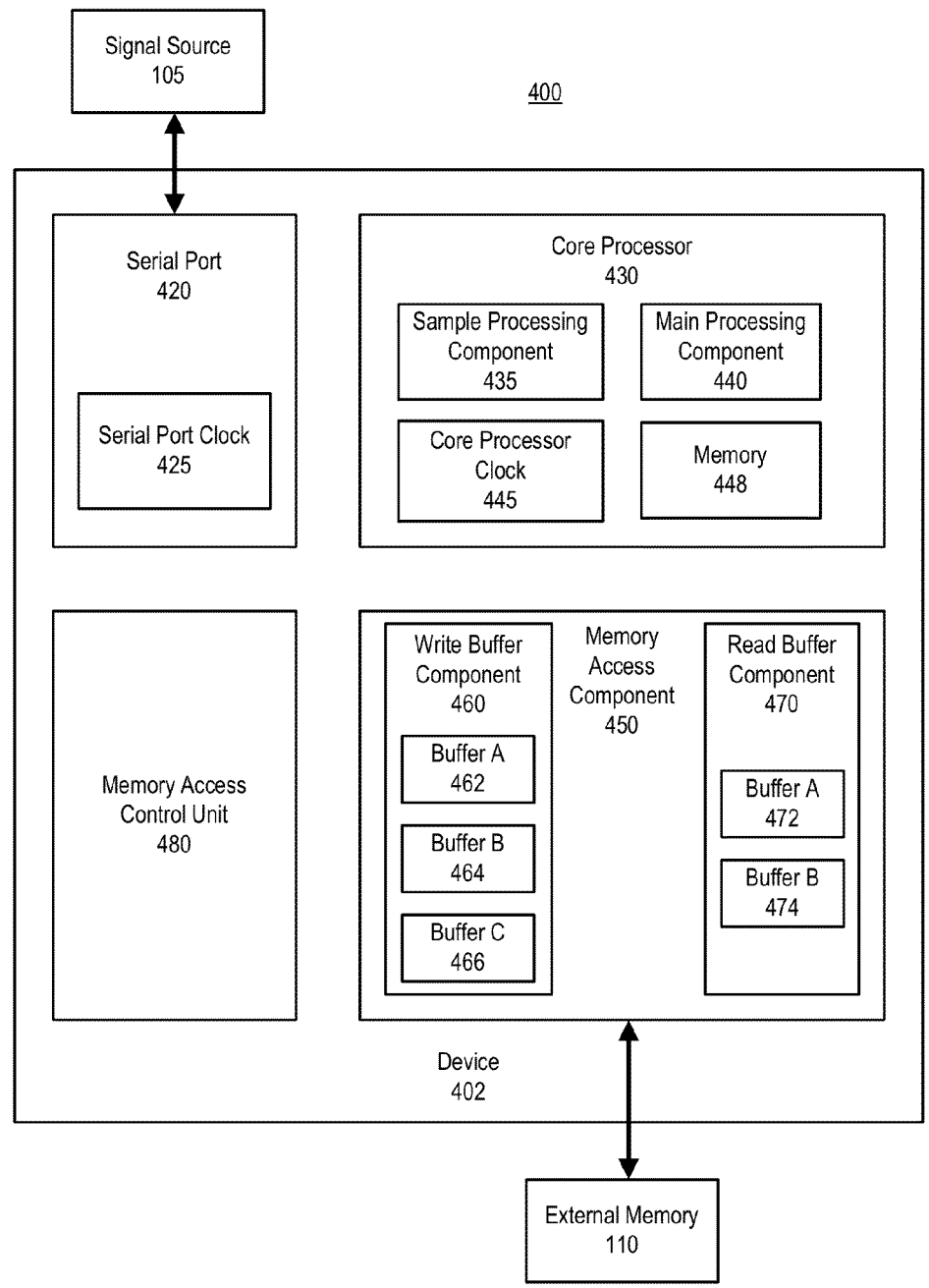
FIG. 4 is a block diagram of an example electronic device network.

FIG. 4 shows an alternative example of an electronic device network 400 with an electronic device 402. The electronic device 402 may communicate with the signal source 105 and the external memory 110. The signal source 105 may be similar to, the same as, or otherwise resemble the signal source 105 in FIG. 1. The external memory 110 may be similar to, the same as, or otherwise resemble the signal source 110 in FIG. 1.

The electronic device 402 may include one or more components which may be similar to, resemble, or operate in a comparable way with one or more components of the electronic device 102. For example, the electronic device 402 may include one or more serial port 420 and serial port clock 425, which may be similar to, resemble, or operate in a comparable way with the serial port 120 and serial port clock 125 of the electronic device 102. Additionally or alternatively, the electronic device 402 may include one or more core processor 430, sample processing component 435, main processing component 440 and core processor clock 445, which may be similar to, resemble, or operate in a comparable way with core processor 130, sample processing component 135, main processing component 140 and core processor clock 145 of the electronic device 102.

The electronic device 402 may differ from the electronic device 102 in various ways. For example, the electronic device 402 may include a memory access component 450 with a write buffer component 460 which may differ from the write buffer component 160. The write buffer component 460 may include three or more write buffers, such as write buffer A 462, write buffer B 464, and write buffer C 466. The write buffer A 462, write buffer B 464, and write buffer C 466 may, in some systems, be contiguous or sequential in memory. While the two buffers 162 and 164 of write buffer component 160 may alternate writing information from the core processor 130 to the external memory 110, the three buffers 462, 464, and 466 of the write buffer component 460 may circulate in a round-robin fashion writing information from the core processor 430.

The write buffer component 460 and three buffers 462, 464, and 466 may be configured or operable to allow a core processor 430 or component of the core processor 430, such as the main processing component 440, to obtain or receive data or information without requiring the data or information to be retrieved by the read buffer component 470. This may be useful, for example, when a delay index is less than or equal to a threshold value, such as when a delay index is less than or equal to 2*N−1 (N=the number of samples per sample burst or clock cycle).

The memory access component 450 may also include a read buffer component 470, which may be similar to, resemble, or operate in a comparable way with the read buffer component 170 of the electronic device 102. The read buffer component 470 may gather data stored in external memory 110, such as data that was stored in a previous clock cycle or at various other times, and may transfer or transmit the data to the core processor 430.

In some instances, the data or samples gathered by the read buffer component 470 may depend on a delay line or delay index set by an algorithm. Where a delay line or delay index is large, the data or samples gathered by the read buffer component 470 may have been stored in the external memory 110 many cycles earlier. Conversely, when a delay line or delay index which is small, such as less than 3 times a burst size, the samples gathered by the read buffer component 470 may include samples which were just recently stored in the external memory 110. Other variations and examples are possible. Though only one set of read buffer component 470 are shown in electronic device 102, in other systems or examples, multiple read buffer component 470 may be implemented or used.

The electronic device 402 may also or alternatively include one or more memory access control units 480. The memory access control unit 480 may control one or more aspects of the memory access component 450. For example, the memory access control unit 480 may control information or data written or transferred by the write buffer component 460 to the external memory 110 and information or data written or transferred by the read buffer component 470 to the core processor 430.

The memory access control unit 480 may direct the core processor 430 to one or more buffers of the memory access component 450 to obtain data or information for further processing. The memory access control unit 480 may control a timing, method, or way that a core processor 430 may access information in the write buffer component 460 or read buffer component 470. For example, each clock cycle, the memory access control unit 480 may receive an indication that the clock cycle is about to begin (or that a previous clock cycle ended), such as by monitoring the serial port 420 or serial port clock 425, or by receiving an indication from the serial port 420 or serial port clock 425. Once the clock cycle indication has been received, the memory access control unit 480 may determine a size of a delay line or delay index. The memory access control unit 480 may determine the delay index size according to a parameter set by a programmer, according to one or more calculations or determinations, at the direction of one or more processors, functions, or algorithms, or in various other ways. For example, in some instances, an algorithm or function in the core processor 430 may set a delay index, and the memory access control unit 480 may gather information about the delay index from the core processor 430. In other systems, the memory access control unit 480 may set the delay index independently from any processes or functions of the core processor 430. The memory access control unit 480 may include code or logic which may be configured or operable to determine a delay index.

The delay index may be set or calculate the clock cycle prior to usage before data is read from either the write buffer component 460 or the read buffer component 470. The delay index may be used by the memory access control unit 480 for transfer from external memory to the read buffer component 470. For efficiency, the delay index may remain constant during this time. If different delay indexes are needed or desired for the same delay line and the delay index is greater than 2*N−1 samples, multiple read buffer components 470 may be used. If the delay is less than or equal to 2*N−1 samples, multiple indexes may be used to access read data from the write buffer component accordingly. Both techniques may be used if a single delay is used for delays greater than 2*N−1 or less than or equal to 2*N−1 samples. In some instances, the technique for delay indexes greater than 2*N−1 may only work if these delay indexes are or could be determined two Z clock cycles before the samples gathered are used by the main processing component 440. In other instances, no such restriction may exist. Other variations are possible.

The memory access control unit 480 may, for example, automatically communicate or transmit a signal or direction to the core processor 430, based on the determined delay index, indicating whether to access data or samples from the read buffer component 470 or the write buffer component 460. The memory access control unit 480 may transmit such a signal or direction every clock cycle, at periodic intervals, when an access location has changed, or at various other times. In other systems, the core processor 430 may request or access information about where to access samples from the memory access control unit 480.

Where the memory access control unit 480 determines that the size of the delay line or delay index is greater than a threshold value, the memory access control unit 480 may direct the core processor 430 to access samples from the read buffer component 470. Where the memory access control unit 480 determines that the size of the delay line or delay index is less than or equal to than a threshold value, the memory access control unit 480 may direct the core processor 430 to access samples from the write buffer component 460.

The memory access control unit 480 may determine a size of the delay line or delay index, or where a core processor 430 should access samples from, before or at the beginning of each new clock cycle. In some systems, once the memory access control unit 480 determines that a delay line or delay index is greater than a threshold value, or that the core processor 430 should use the read buffer component 470 for accessing samples, the memory access control unit 480 may cease making further determinations at subsequent clock cycles. In other systems or other configurations, the memory access control unit 480 may make these determinations each sample clock cycle, within a constant Z clock cycle, for use by the core processor 430, regardless of the result of the determination during a previous Z clock cycle. Other variations and configurations are possible.

Figure 5:
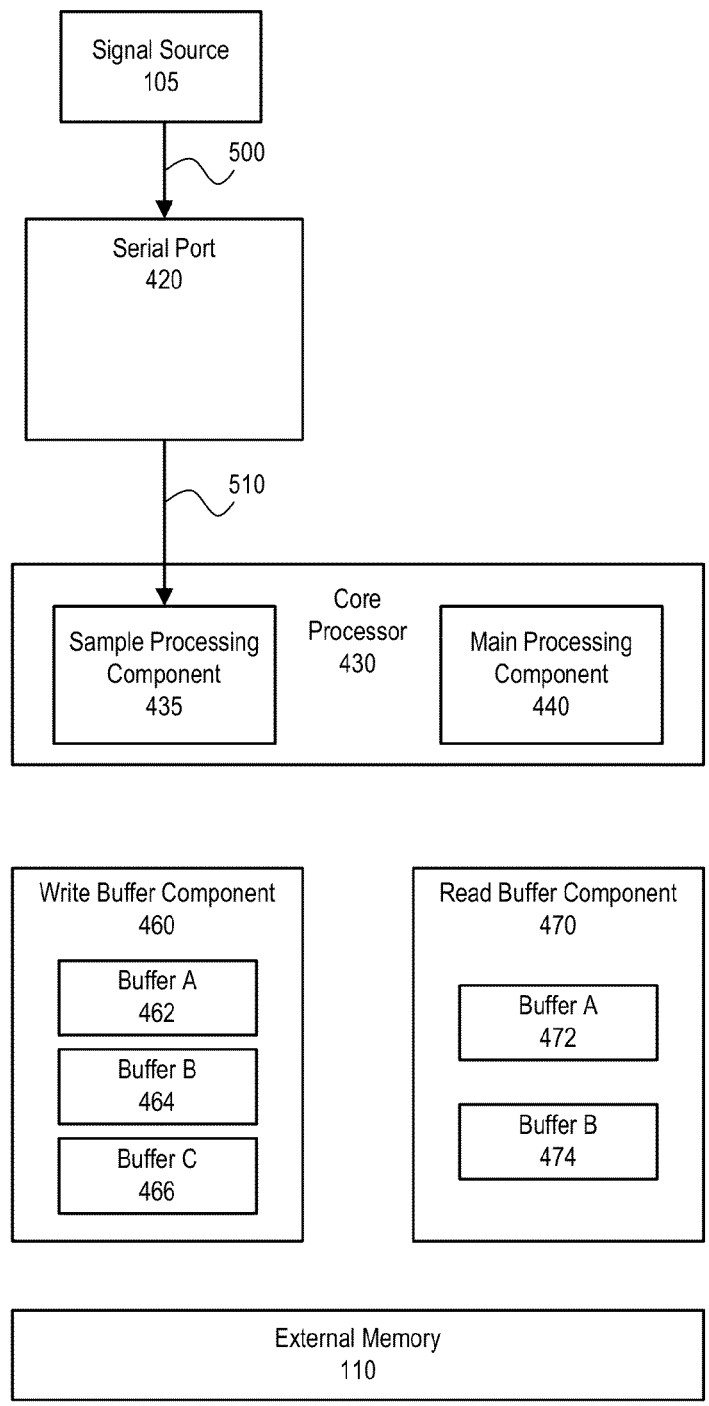
FIG. 5 is a block diagram of an example operation of an electronic device.

FIGS. 5-11 show examples of how components of the electronic device 402 may operate. FIG. 5 shows an example operation of the electronic device 402 at a first clock cycle Z. The operation shown in FIG. 5 may be performed with data having any delay indexing, including a delay indexing greater than a threshold value or a delay indexing less than or equal to a threshold value.

At clock cycle Z, a signal source 105 may output, transmit, or otherwise deliver to the serial port 420 a signal, data, or other information 500. For example, the signal source 105 may transmit an audio signal to the serial port 420 continuously. During clock cycle Z, the serial port 420 may gather, generate, or create one or more samples. Before the end of clock cycle Z, the serial port 420 may output, transmit, or otherwise send the first set of samples 510 (or sample burst) to the core processor 430. For example, the first set of samples 510 may be sent to or accessed by the sample processing component 435.

Figure 6:
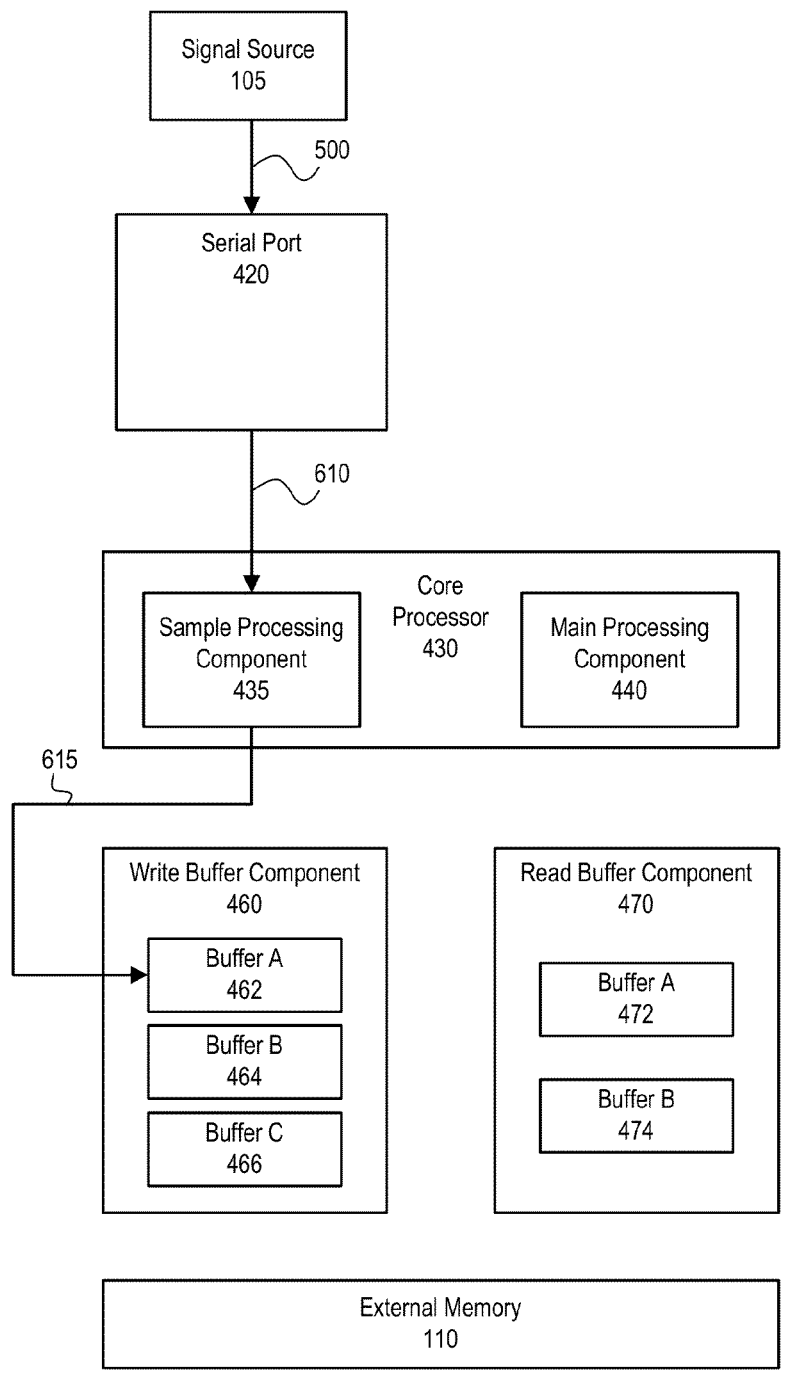
FIG. 6 is a block diagram of an example operation of an electronic device.

FIG. 6 shows an example operation of the electronic device 402 at a second clock cycle Z+1. The operation shown in FIG. 6 may be performed with any delay indexing, including a delay indexing greater than a threshold value.

During clock cycle Z+1, the sample processing component 435 may process the first set of samples 510 that were received by the end of clock cycle Z. As the samples are processed by the sample processing component 435, or by the end of the clock cycle Z+1, the initially processed samples 615 processed by the sample processing component 435 may be written into one of the write buffer component 460, such as buffer A 462.

Also or alternatively during clock cycle Z+1, the serial port 420 may continue to gather, generate, or create one or more samples from the signal 500 from the signal source 105. By the end of clock cycle Z+1, the serial port 420 may output, transmit, or otherwise send the second set of samples 610 to the core processor 430.

Figure 7:
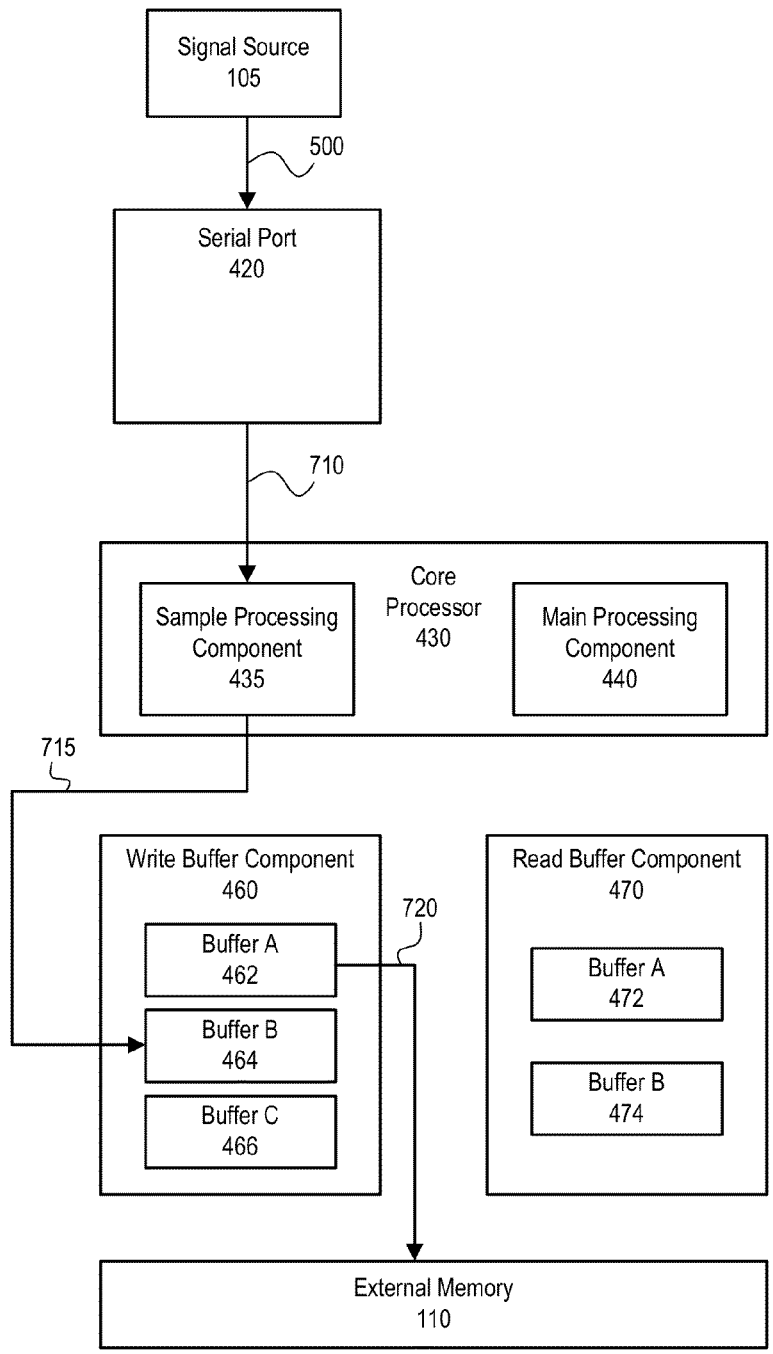
FIG. 7 is a block diagram of an example operation of an electronic device.
Figure 8:
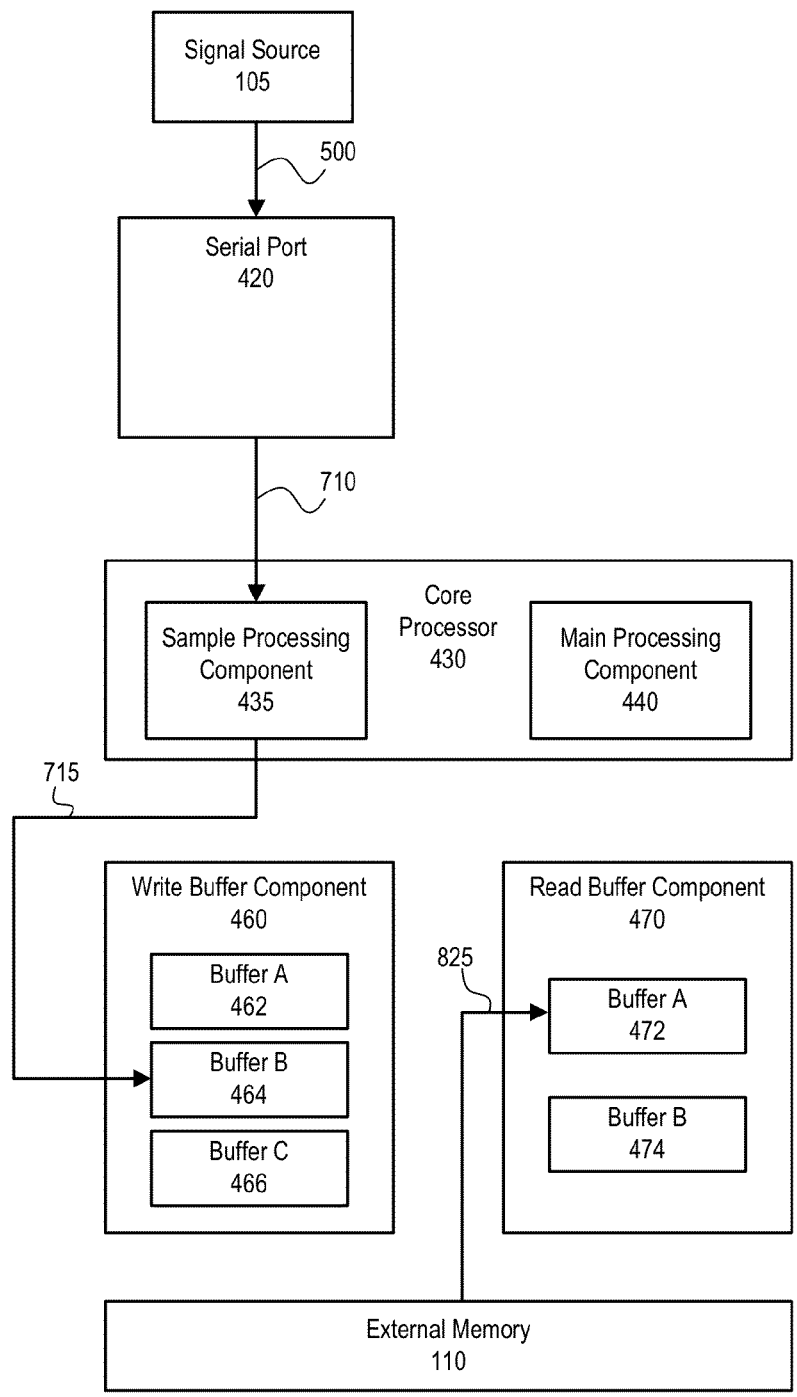
FIG. 8 is a block diagram of an example operation of an electronic device.

FIG. 7 shows an example operation of the electronic device 402 at an early stage or phase of a third clock cycle Z+2. FIG. 8 shows an example operation of the electronic device 402 at a late stage or phase of a third clock cycle Z+2. The operations shown in FIGS. 7 and 8 may be performed when data is associated with a delay indexing greater than a threshold value, such as with a delay indexing greater than 2*N−1.

During the early stage or phase of the third clock cycle Z+2 where the delay indexing is greater than 2*N−1, the initially processed samples 615 written into buffer A 462 during the previous clock cycle may be written or otherwise transferred as written samples 720 to the external memory 110 by the write buffer component 460.

During the late stage or phase of the third clock cycle Z+2 where the delay indexing is greater than 2*N−1, the read buffer component 470 may gather data or samples 825 from the external memory 110. For example, where the delay index is between 2*N and 3*N−1, the read buffer A 472 may gather, during a late phase of the third clock cycle, the written samples 720 from the external memory 110 that were written by the write buffer A during the early stage of the Z+2 clock cycle.

During either or both the early and late phase of the clock cycle Z+2, the serial port 420 may continue to gather, generate, or create one or more samples from the signal 500 from the signal source 105, and may output, transmit, or otherwise send the third set of samples 710 to the core processor 430. Also or alternatively during either or both the early and late phase of the clock cycle Z+2, the sample processing component 435 may process the second set of samples 610 that were received by the end of clock cycle Z+1. As the samples are processed by the sample processing component 435, or by the end of the clock cycle Z+2, the initially processed samples 715 may be written into one of the buffers of the write buffer component 460, such as buffer B 464.

Figure 9:
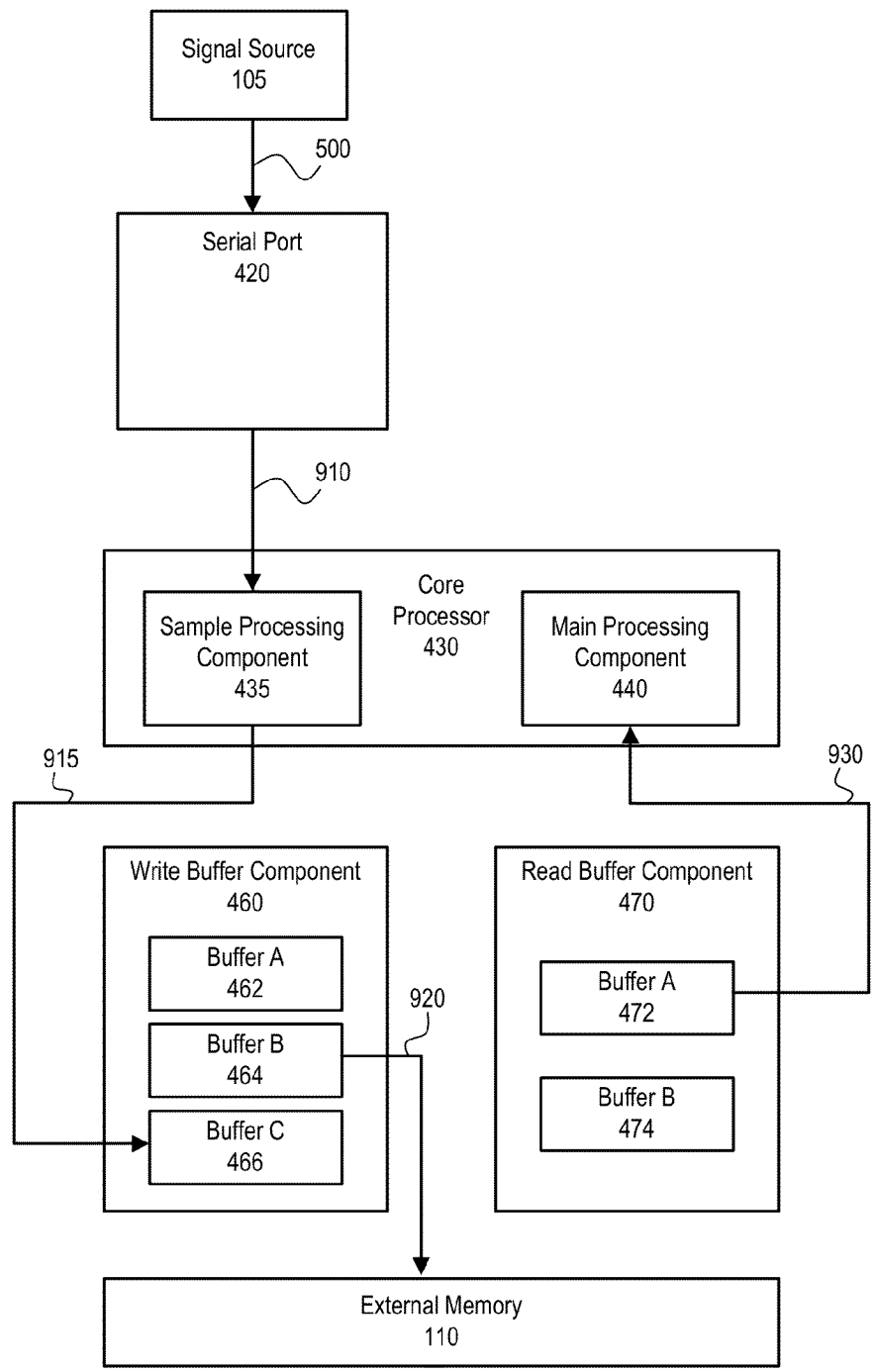
FIG. 9 is a block diagram of an example operation of an electronic device.
Figure 10:
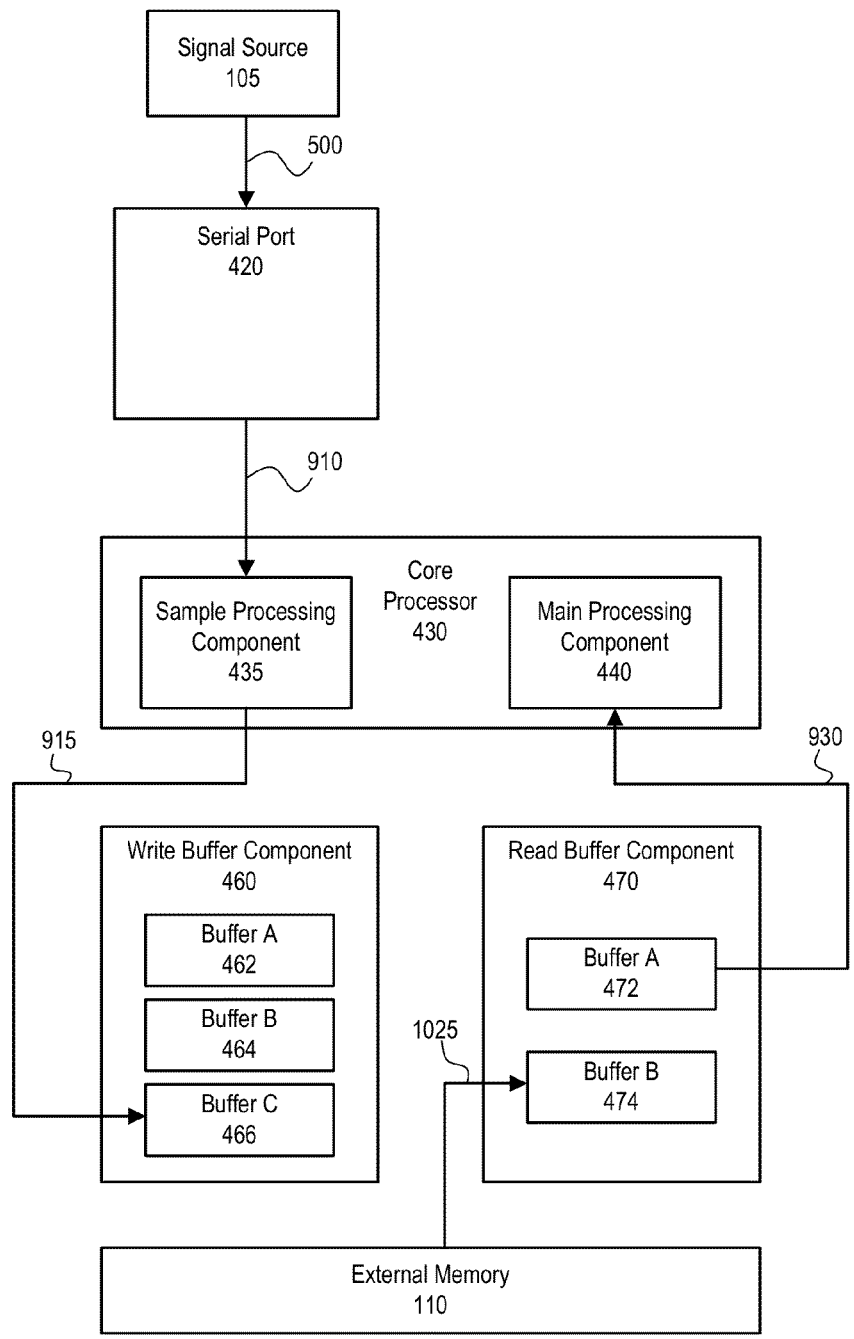
FIG. 10 is a block diagram of an example operation of an electronic device.

FIG. 9 shows an example operation of the electronic device 402 at an early stage or phase of a fourth clock cycle Z+3. FIG. 10 shows an example operation of the electronic device 402 at a late stage or phase of a fourth clock cycle Z+3. The operations shown in FIGS. 9 and 10 may be performed with a delay indexing greater than a threshold value, such as with a delay indexing greater than 2*N−1.

During the early stage or phase of the fourth clock cycle Z+3 for the case where the delay indexing is greater than 2*N−1, the initially processed samples 715 written into buffer B 464 during the previous clock cycle may be written or otherwise transmitted, as written samples 920, to the external memory 110 by the write buffer component 460.

Also or alternatively during an early and/or late phase of the fourth clock cycle Z+3, the main processing component 440 may receive buffered samples 930 for processing. The buffered samples 930 may be transmitted by or accessed from the buffer A 472 which may have gathered these samples during the previous clock cycle Z+2. For example, the buffered samples 930 received by the main processing component 440 during the fourth clock cycle Z+3 may be the written samples 720 written to the external memory 110 by the buffer A 462 during the early stage of the Z+2 clock cycle, which in turn may be the preprocessed samples 615 previously used by the core processor 430 during the Z+1 clock cycle. Accordingly, in this operation of the electronic device 402, the core processor 430 may first be able to receive samples that it previously sent to external memory 110 via a read buffer component 470 one clock cycle (N) after the samples were written from the write buffer component 460 to the external memory 110 or two clock cycles (2*N) due to the sampling processing component and the data written to the write buffer component 460.

During the late stage or phase of the fourth clock cycle Z+3 where the delay indexing is greater than 2*N−1, the read buffer component 470 may gather data or samples 1025 previously written into the external memory 110. For example, if the delay index is 2*N, during the late stage or phase of the third clock cycle Z+3, the read buffer B 474 may gather the written samples 920 written to the external memory 110 by the buffer B 464 during the early stage of the Z+3 clock cycle. In this example, any index that is greater than 2*N−1 may exhibit the same type of behavior with the exception of the Z+3 clock cycle previously mentioned. In this specific example, a delay index may not be required to be an integer multiple of N but must be greater than 2*N−1. Other examples and variations are possible.

Also or alternatively during either or both the early and late phase of the clock cycle Z+3, the serial port 420 may continue to gather, generate, or create one or more samples from the signal 500 from the signal source 105, and may output, transmit, or otherwise send the fourth set of samples 910 to the core processor 430. Also or alternatively during either or both the early and late phase of the clock cycle Z+3, the sample processing component 435 may process the third set of samples 710 that were received during the clock cycle Z+2, and process these samples creating samples 915, which may be written into one of the write buffer component 460. The initially processed samples 915 may be written, for example, in buffer C 466. In this example, rather than having two write buffers (as in write buffer component 160), the write buffer component 460 has a third buffer C 466. As such, the data stored in the buffer A 462 may be stored for an extra clock cycle before being written over with new data. Other variations are possible.

Figure 11:
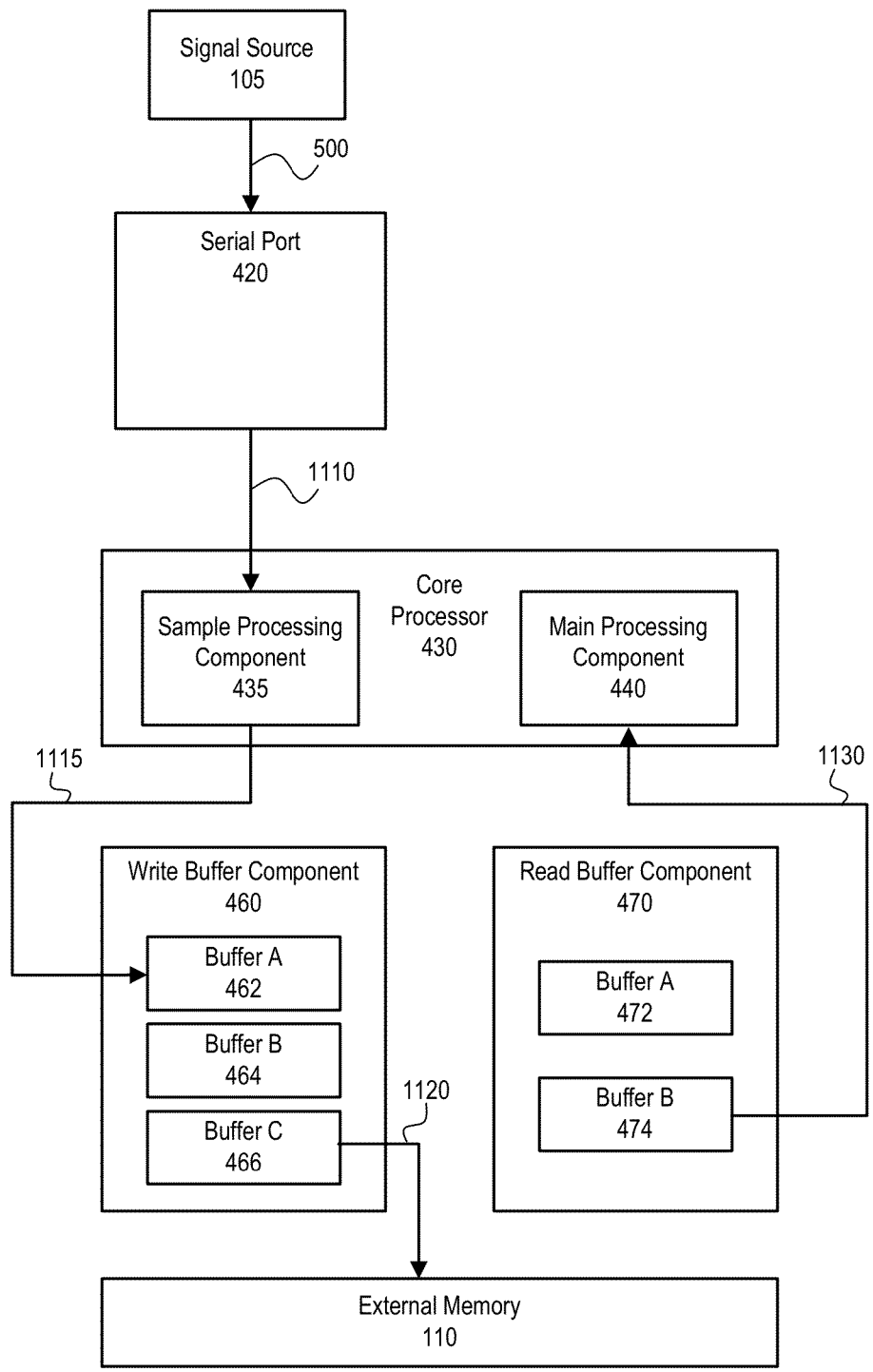
FIG. 11 is a block diagram of an example operation of an electronic device.

FIG. 11 shows an example operation of the electronic device 402 at an early stage or phase of a fifth clock cycle Z+4. The operation shown in FIG. 11 may be performed with a delay indexing greater than a threshold value, such as with a delay indexing greater than 2*N−1. The early stage of the fifth clock cycle Z+4 may be very similar to or otherwise resemble the early stage in the fourth clock cycle Z+3, but with data or information being stored, written, transmitted to, or otherwise transferred using different buffers.

During the early stage or phase of the fifth clock cycle Z+4 where the delay indexing is greater than 2*N−1, the preprocessed samples 915 written into buffer C 466 during the previous clock cycle may be written or otherwise transmitted, as written samples 1120, to the external memory 110 by the write buffer component 460.

During either or both an early and late phase of the fifth clock cycle Z+4, the main processing component 440 may receive buffered samples 1130 for processing. The buffered samples 1130 may be transmitted by or accessed from the buffer B 474 which may have gathered these samples during the previous clock cycle Z+3. For example, with a delay index equal to 2*N, the buffered samples 1130 received by the main processing component 440 during the fifth clock cycle Z+4 may be the samples 920 written to the external memory 110 by the buffer B 464 during the early stage of the Z+3 clock cycle and subsequently read back during the late stage of the Z+3 clock cycle into buffer B 474 of the read buffer component, which may be the preprocessed samples 715 previously used by the core processor 430 during the Z+2 clock cycle. In some examples, a delay index may not be required to be an integer multiple of N, but may be greater than 2*N−1. Other variations are possible.

Also or alternatively during either or both the early and late phase of the clock cycle Z+4, the serial port 420 may continue to gather, generate, or create one or more samples from the signal 500 from the signal source 105, and may output, transmit, or otherwise send the fifth set of samples 1110 to the core processor 430 to process on the next clock cycle of Z.

Also or alternatively during either or both the early and late phase of the clock cycle Z+4, the sample processing component 435 may process the fourth set of samples 910 that were received before the end of clock cycle Z+3. As the samples are processed by the sample processing component 435, or before the end of the clock cycle Z+4, the initially processed samples 1115 may be written into one of the buffers of the write buffer component 460. The initially processed samples 1115 may be written, for example, in buffer A 462, and may overwrite the first set of samples 615 that were previously stored in buffer A 462.

In contrast to the electronic device 102, the electronic device 402 may thus operate to cycle through three buffers A 462, buffer B 464, and buffer C 466 of the write buffer component 460 in transferring or writing data or information from the core processor 430 to the external memory 110. In an operating mode where the delay is greater than a threshold value, such as where the delay indexing is greater than 2*N−1, the main processing component 440 may continue to obtain samples from the external memory 110 using the read buffer component 470 in a manner similar to the how the main processing component 140 may obtain the samples from the external memory 110 using the read buffer component 170.

However, where the delay indexing is less than or equal to a threshold value, such as 2*N−1, however, the main processing component 440 may not be able to obtain samples through the read buffer component 470, as no samples may be available from the sample processing component 435 and the read buffer component 470 until a period of at least 2*N samples or 2 clock cycles of Z has occurred. In these instances, the electronic device 402 may be configured or operable to deliver samples stored in the write buffer component 460 to the main processing component 440. In some instances, the memory access control unit 480 may, for example, determine or otherwise identify a delay indexing, and may trigger the main processing unit 440 or the write buffer component 460 to send samples from a buffer of the write buffer component 460 to the main processing unit 440.

FIGS. 12-16 show an example of how components of the electronic device 402 may operate when a delay indexing is less than a threshold value. FIG. 5 may show a first clock cycle Z, where the electronic device 402 may operate regardless of the delay indexing.

Figure 12:
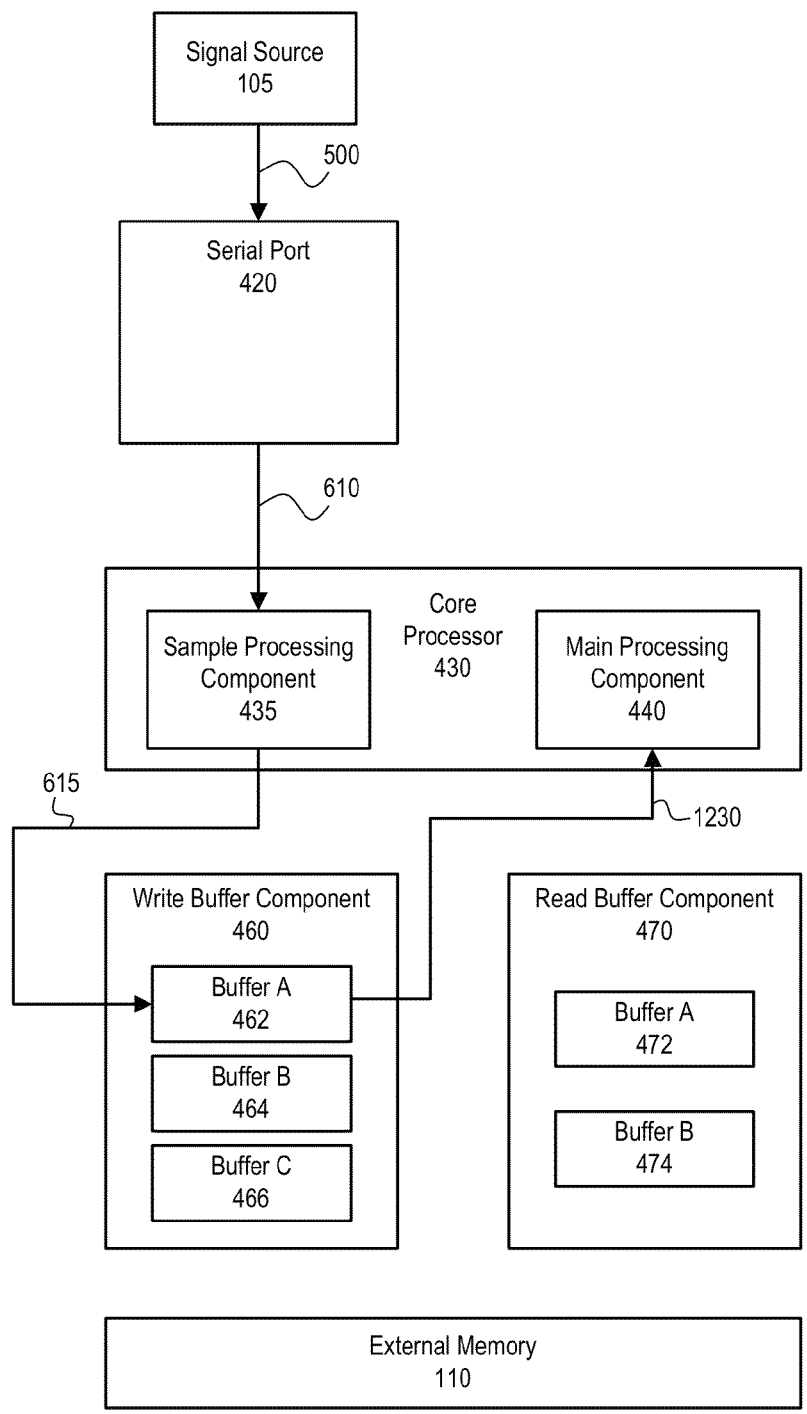
FIG. 12 is a block diagram of an example operation of an electronic device.

FIG. 12 shows an example of an operation of the electronic device 402 during a second clock cycle Z+1, when a delay index is less than or equal to a threshold value, such as 2*N−1. In FIG. 12, as in FIG. 6, the sample processing component 435 may process the first set of samples 510 that were received by the end of clock cycle Z. As the samples are processed by the sample processing component 435, or by the end of the clock cycle Z+1, the initially processed samples 615 processed by the sample processing component 435 may be written into one of the write buffer component 460, such as buffer A 462. Also or alternatively during clock cycle Z+1, the serial port 420 may continue to gather, generate, or create one or more samples from the signal 500 from the signal source 105. By the end of clock cycle Z+1, the serial port 420 may output, transmit, or otherwise send the second set of samples 610 to the core processor 430.

However, when the delay index is less than or equal to the threshold value, such as 2*N−1, the main processing component 440 may be configured or operable to gather samples directly from the write buffer component 460. For example, where a delay index is very small, such as less than a batch size N, the main processing component 440 may be configured or operable to gather the samples 615 in clock cycle Z+1 (referred to as samples 1230 when retrieved by the main processing component 440) directly from the write buffer A 462, either as they are being written to the write buffer A 462 by the sample processing component 435 or shortly thereafter. The main processing component 440 may access and retrieve these samples 1230 during an early or last phase of the clock cycle Z+1. In this way, the written samples 720 previously processed by the sample processing component 435 may be accessible to and processed by the main processing component 440 earlier than they would otherwise be available via the read buffer component 470.

Figure 13:
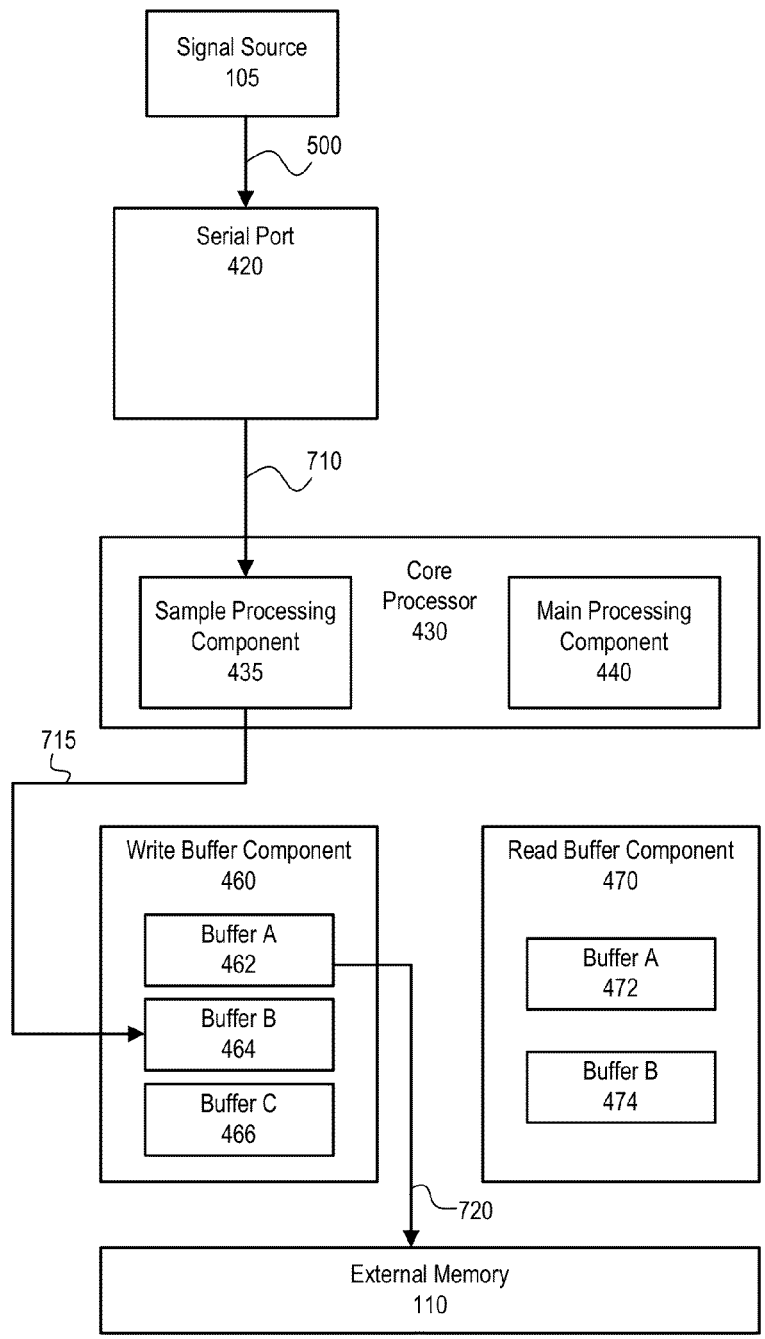
FIG. 13 is a block diagram of an example operation of an electronic device.
Figure 14:
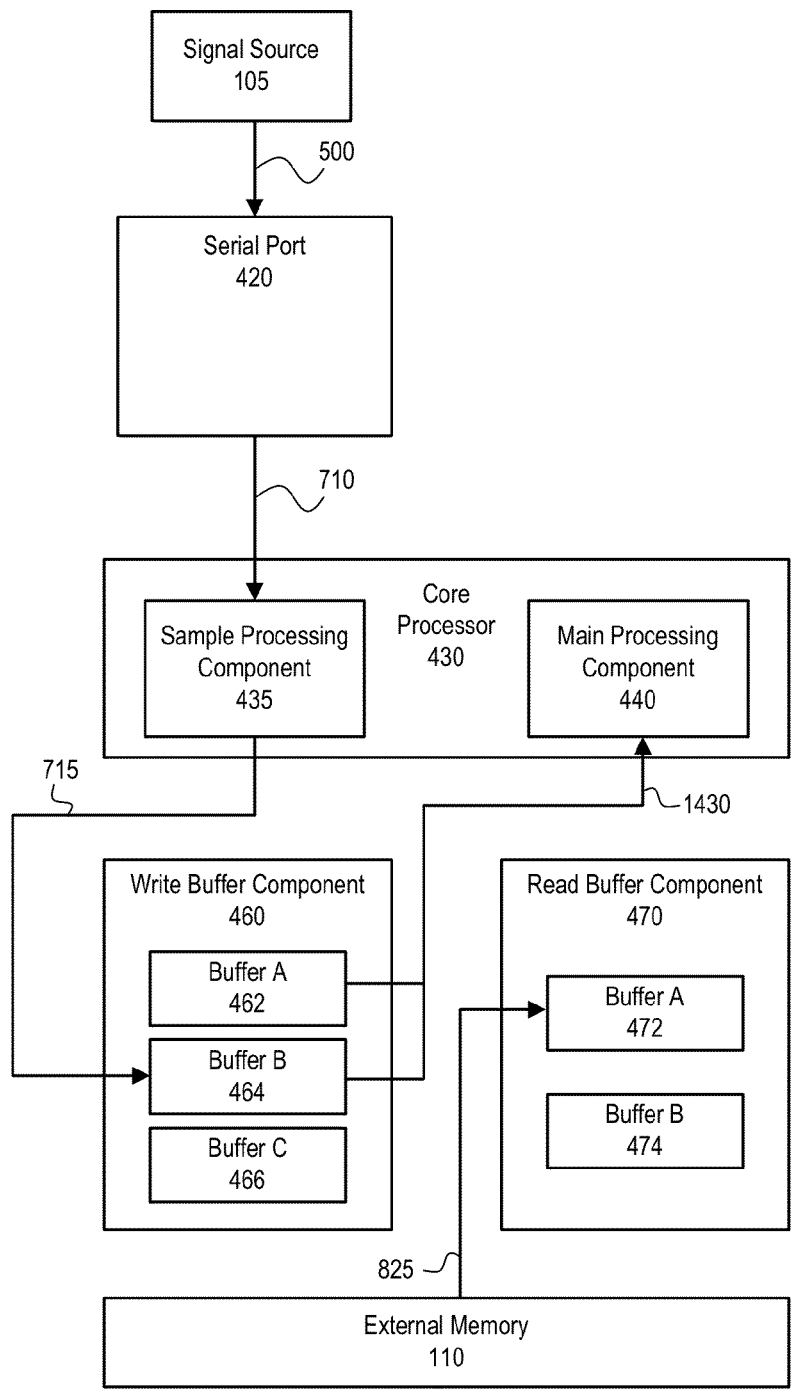
FIG. 14 is a block diagram of an example operation of an electronic device.

FIG. 13 shows an example of an early phase or stage of the third clock cycle Z+2 when the delay indexing is less than or equal to the threshold value. FIG. 14 shows an example operation of the electronic device 402 at a late stage or phase of a third clock cycle Z+2 when the delay indexing is less than or equal to the threshold value.

During the early stage or phase of the third clock cycle Z+2 where the delay indexing is less than or equal to 2*N−1, the initially processed samples 615 written into buffer A 462 during the previous clock cycle may be written or otherwise transmitted, as write samples 720, to the external memory 110 by the write buffer component 460. This may resemble, be similar to, or operate in the same fashion as the operation of the electronic device in FIG. 7.

During the late stage or phase of the third clock cycle Z+2 where the delay index is less than or equal to 2*N−1, the read buffer component 470 may gather data or samples 825 previously written into the external memory 110. For example, during the late stage or phase of the third clock cycle Z+2, the read buffer A 472 may gather the write samples 720 written to the external memory 110 by the buffer A 462 during the early stage of the Z+2 clock cycle.

However, in this case, the main processing component 440 may also access, gather, read, or receive data or samples 1430 directly from the buffer B 464 and/or buffer A 462 of the write buffer component. For example, the main processing component 440 may access samples 715 written during the clock cycle Z+2 to the buffer B 464 by the sample processing component, and/or samples 615 written during the clock cycle Z+1 to the buffer A 462. The accessed samples may be referred to as samples 1430. In this way, the written samples 720 previously processed by the sample processing component 435, as well as those samples 715 just written to the buffer B 464, may be accessible to and processed by the main processing component 440 as samples 1430 earlier than they would otherwise be available via the read buffer component 470.

The main processing component 440 may determine which buffers, such as buffer B 464 or buffer A 462, to access the samples from during the clock cycle Z+2 based on the delay index. For example, in some systems, where a delay index is equal to the size of a batch, the main processing component 440 may retrieve all of the samples from the buffer A 462, as the desired samples may be only those samples previously written in buffer A 462 during clock cycle Z+1. Where instead the delay index is less than a size of a batch, some of the desired samples may have been written to buffer B 464 of the write buffer component 460 during the same clock cycle Z+2 and some may have been written to buffer A 462, as the buffers of the write buffer component 460 may be contiguous in memory. As such, in this example, the main processing component 440 may gather some of the samples from buffer B 464, and the rest of the samples from buffer A 462. Other variations and examples are possible.

While the samples 1430 are shown in FIGS. 13-14 as being read by the main processing component 440 from the write buffer component 460 during the late phase of the Z+2 clock cycle in FIG. 14, it should be appreciated that in other instances, the samples 1430 may be read by the main processing component 440 during an early phase of the Z+2 clock cycle in FIG. 13, or at various other times, such as before any of the samples 720 are transferred or written to the external memory 110. Other variations are possible.

Figure 15:
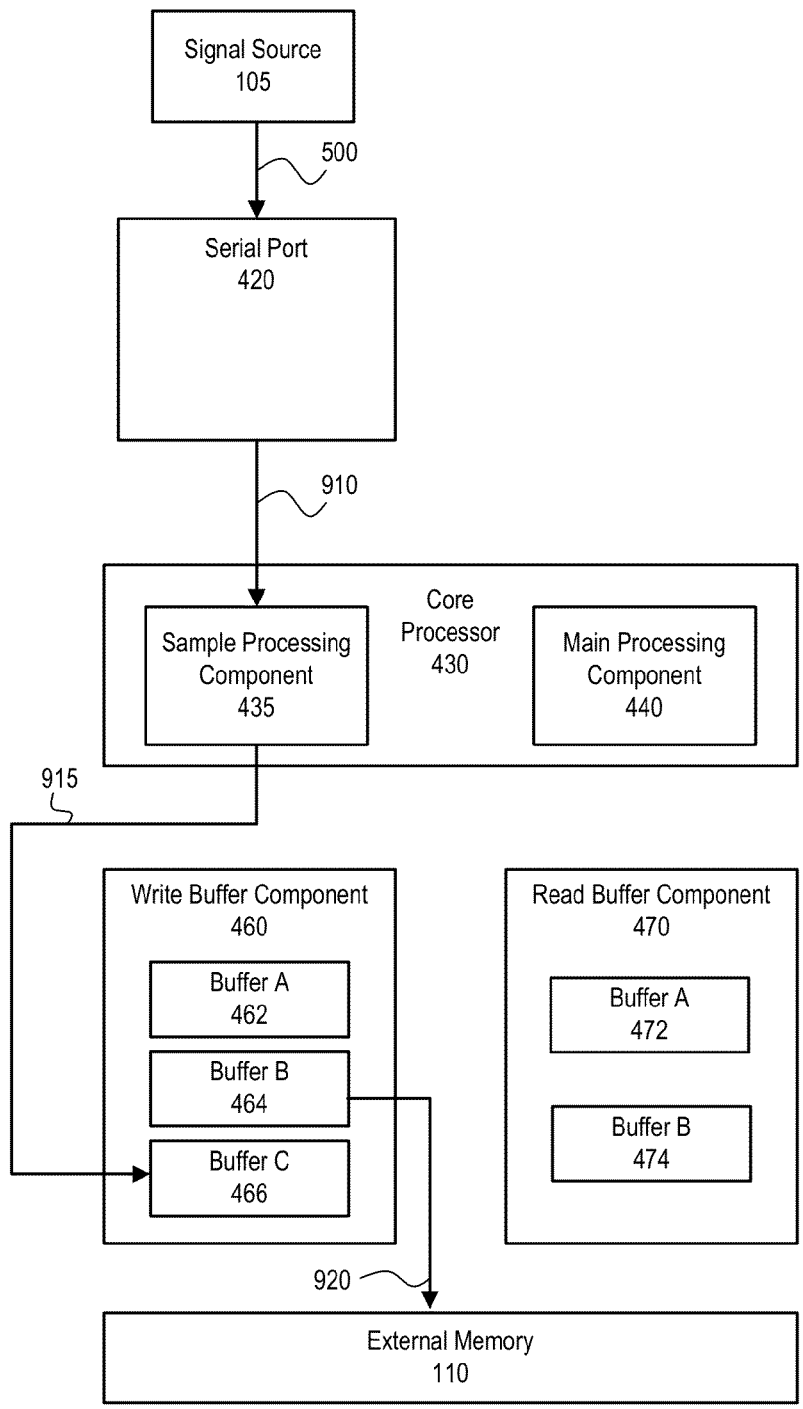
FIG. 15 is a block diagram of an example operation of an electronic device.

FIG. 15 shows an example operation of the electronic device 402 at an early stage or phase of a fourth clock cycle Z+3, when a delay indexing is less than or equal to a threshold value, such as 2*N−1. The operation of the electronic device 402 in FIG. 15 may be similar to the operation of the electronic device 402 in FIG. 9. During the early stage or phase of the fourth clock cycle Z+3, the initially processed samples 715 written into buffer B 464 during the previous clock cycle may be written or otherwise transmitted, as written samples 920, to the external memory 110 by the write buffer component 460.

However, in FIG. 15, no samples from the buffer A 472 of the read buffer component 470 may be transferred to or received by the main processing component 440.

This may be because the samples 1230 and/or 1430 previously stored in buffer A 462/B 464 and transferred during the previous clock cycles Z+1 and/or Z+2 may already be with the main processing component 440, which may be processing those samples 1230 or 1430. As such, the data and samples in the buffer A 472 may merely sit in the buffer A 472 without being used further. In some instances, the read buffer component 470 may be inactive or removed until otherwise needed for a delay index of greater than the threshold. In other cases, scratch place-holder data may be transferred as in FIG. 16 as is the case for a delay index of less than 2*N−1.

Figure 16:
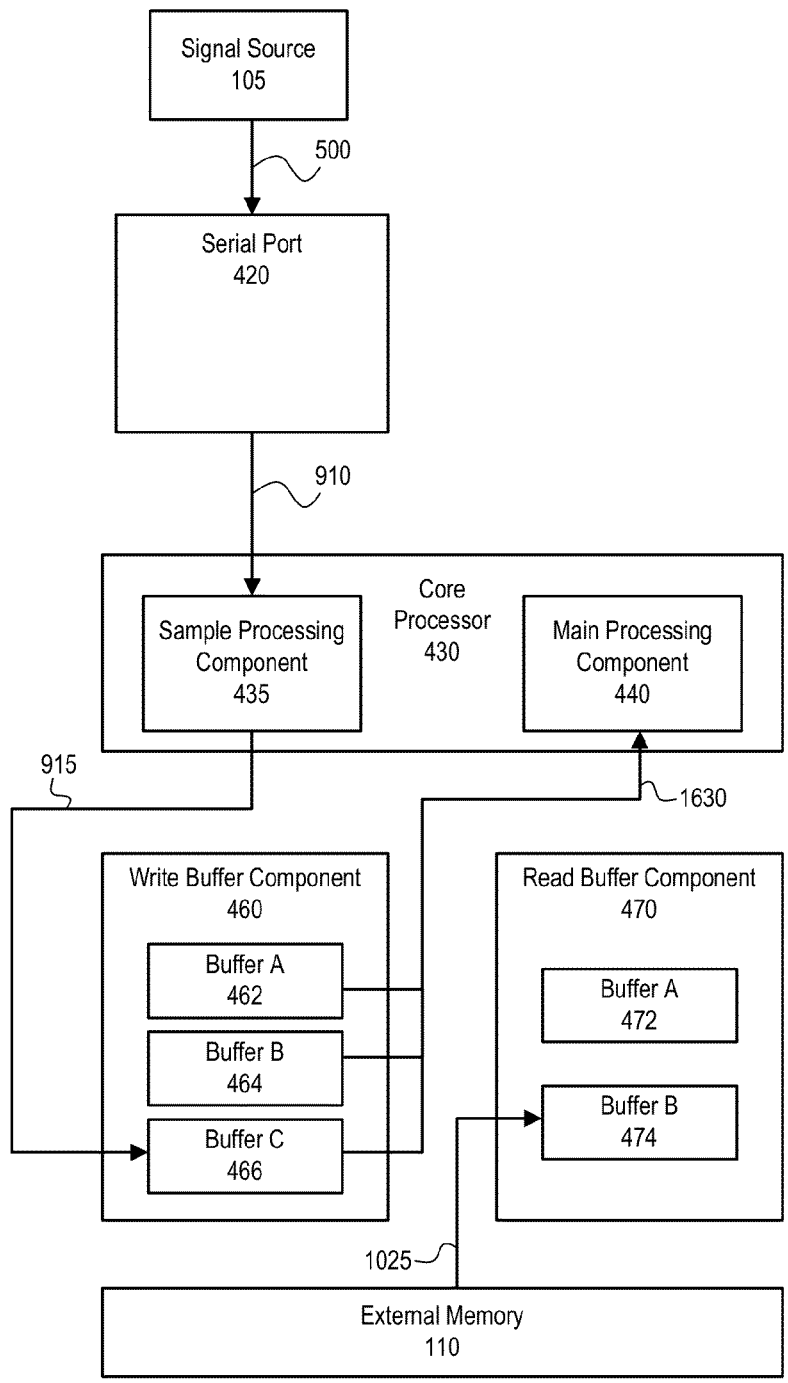
FIG. 16 is a block diagram of an example operation of an electronic device.

FIG. 16 shows an example operation of the electronic device 402 at a late stage or phase of a fourth clock cycle Z+3 when the delay indexing is less than or equal to the threshold value. During the late stage or phase of the fourth clock cycle Z+3 where the delay indexing is less than or equal to 2*N−1, the read buffer component 470 may gather data or samples 1025 previously written into the external memory 110. For example, during the late stage or phase of the fourth clock cycle Z+3, the read buffer B 474 may gather the written samples 920 written to the external memory 110 by the write buffer B 464 during the early stage of the Z+3 clock cycle.

However, as in FIGS. 12 and 14, the main processing component 440 may gather or read the samples 615, 715, and/or 915 directly from one or more of the write buffer C 466, write buffer B 464, and the write buffer A 462 of the write buffer component 460. For example, the buffer C 466 may transmit or otherwise make accessible to the main processing component 440 the samples 915 that were written to the buffer C 466 by the sample processing component 435 during the clock cycle Z+3. Additionally, the main processing component 440 may read the samples 715 that were written to buffer B 464 during the previous clock cycle Z+2, and/or the samples 615 that were written to buffer A 462 during the earlier clock cycle Z+1. As such, the initially processed samples may be accessible to and processed by the main processing component 440 earlier than they would otherwise be available via the read buffer component 470, such within one clock cycle.

The main processing component 440 may determine which buffers, such as buffer C 466, buffer B 464 or buffer A 462, to access the samples from during the clock cycle Z+3 based on the delay index. For example, in some systems, where the delay index is less than a size of a batch, some of the desired samples may have only been written to buffer C 466 of the write buffer component 460 during the same clock cycle Z+3. As such, in this example, the main processing component 440 may gather some of the samples from buffer C 466, and the rest of the samples from buffer B 464. As another example, where a delay index is equal to the size of a batch, the main processing component 440 may retrieve all of the samples from the buffer B 464, as the desired samples may be only those samples previously written in buffer B 464 during the clock cycle Z+2. As another example, where a delay index is greater than the size of a batch but less than the threshold value of 2*N−1, the main processing component 440 may retrieve some samples from the buffer B 464, and the rest of the samples from buffer A 462, as the delay may indicate that some of the samples were stored in the buffer B 464 during the clock cycle Z+2, and the rest were stored in the buffer A 462 in the earlier clock cycle Z+1. These examples may result, for example, where the buffers of the write buffer component 460 are contiguous or sequential in memory, as a circular or circulating round-robin buffer. Other variations and examples are possible.

While the samples 1630 are shown in FIGS. 15-16 as being read by the main processing component 440 from the write buffer component 460 during the late phase of the Z+3 clock cycle in FIG. 16, it should be appreciated that in other instances, the samples 1630 may be read or accessed by the main processing component 440 during an early phase of the Z+3 clock cycle in FIG. 15, or at various other times, such as before any of the samples 920 are transferred or written to the external memory 110. Other variations are possible.

In these and subsequent clock cycles, the use or include three or more buffers, such as buffer A 462, buffer B 464, and buffer C 466, for the write component 460 may prove beneficial. The use of a third buffer (as opposed to using only two buffers) may be useful in various situations and for various reasons. For example, the third buffer may be useful in a borderline scenario where a delay index is set near the threshold value, and while accessing the N samples, the threshold may be crossed. In this example, N samples which may have been written two clock cycles previously by the sample processing component 435 may still be accessible and read directly from the write component 460 by the main processing component 440. This third buffer may act as a guard buffer.

As a non-limiting numerical example, a delay index may be set at 13, with a batch size N of 8. In this example, the threshold value may be equal to 15, and the delay index may be less than the threshold value. In this example, assume the sample processing component 435 is writing samples 915 to the buffer C 466 during clock cycle Z+3. In gathering the samples, the main processing component 440 may gather a first sample of the batch at index 13, a second sample of the batch at index 14, a third sample of the batch at index 15, and so forth. In this example, the first three samples may all be written in buffer B 464, as the access delay may indicate that they were written during the previous clock cycle Z+2. The fourth, fifth, sixth, seventh, and eighth samples may, however, have an access delay that is greater than the threshold value. Because the write buffer component 460 includes a third buffer, however, these samples may still be accessible to the main processing component 440. In this example, these fourth through eighth samples may still be stored in the buffer A 462 from two previous clock cycles, and may be accessed from the buffer A 462 using the main processing component 440. This example shows one instance where the use of three buffers may allow the main processing component 440 to access samples in a borderline or crossover scenario where the delay index is less than, but close to, the threshold value. Various other examples are possible.

Figure 17:
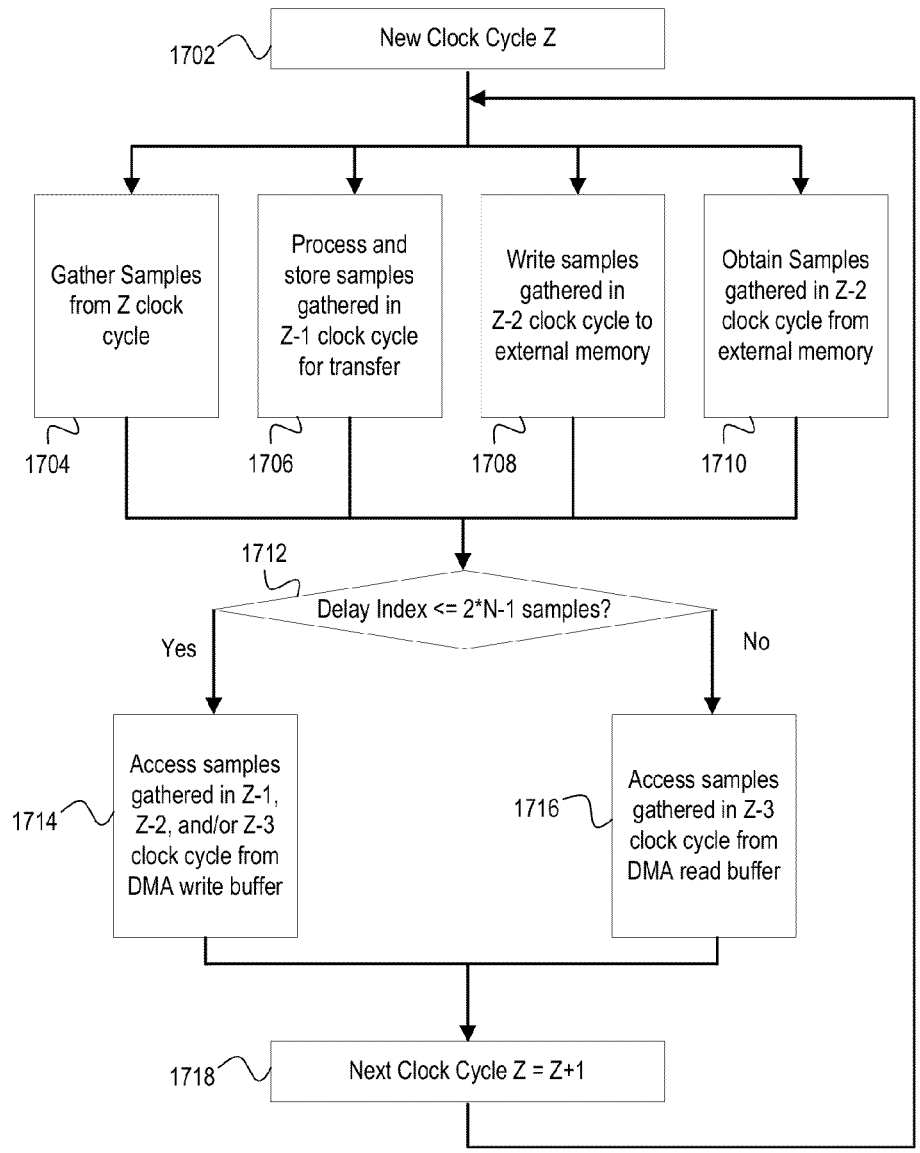
FIG. 17 is a flow diagram of an example method of operating an electronic device.

FIG. 17 shows an example method of operation for an electronic device 402. The method may begin at block 1702 with a new clock cycle Z. After block 1702, the method may proceed to blocks 1704, 1706, 1708, and 1710. The electronic device 402 may perform one or more of the blocks 1704, 1706, 1708, and 1710 in any order or simultaneously.

At block 1704, the electronic device 402 may gather samples for the new clock cycle Z. For example, the serial port 420 may gather, generate, or create samples from the signal source 105 at block 1704.

At block 1706, the electronic device 402 may process and store samples gathered by the serial port 420 in the previous clock cycle Z−1. For example, the sample processing component 435 may process the samples, after which the samples may be passed to or written to one of the write buffer component 460.

At block 1708, the electronic device 402 may write samples that were gathered two cycles earlier (gathered by the serial port 420 two clock cycles ago) to external memory 110. For example, a write buffer component 460 which was written or included samples processed during the previous clock cycle may write these samples to the external memory at block 1708.

At block 1710, the electronic device 402 may obtain samples gathered two cycles earlier (gathered by the serial port 420 at that time). The samples may, for example, be the samples written to the external memory in block 1708. In some systems, this block 1708 may take place before the block 1710, such as during a first, initial, or early stage or phase of the clock cycle Z. In some examples, serial port samples that were written many clock cycles earlier may also be gathered, such as where the delay line is long enough.

At block 1712, the electronic device 402 may determine whether or not a delay index is less than or equal to a threshold value, such as 2*N−1. In some systems, the memory access control unit 480 may make the determination in block 7612.

When the delay is less than or equal to the threshold value, the method may proceed to block 1714. In block 1714, the core processor 430 may access samples from the write buffer component 460. The samples gathered in block 1714 may, for example, be the same as those samples stored by the sample processing component 435 in a write buffer during the Z−1, Z−2, or Z−3 clock cycles, including those samples written in block 1708. Operation of this block may resemble the gathering of samples 1230 in FIG. 12, samples 1430 in FIG. 14, and/or samples 1630 in FIG. 16.

If, at block 1712, the delay index is instead greater than the threshold value, the method may proceed to block 1716. At block 1716, the electronic device 402 may access samples gathered two clock cycles earlier using the read buffer component 470. Operation of this block may resemble the gathering of samples 930 in FIG. 10.

In some specific examples, the delay index may be greater than 2*N−1 if the delay line can support it (is long enough) and the operation is similar or the same, except that older samples are gathered. The external memory 110 may "unlink" the reads from the writes when the delay index is greater than 2*N−1. Other variations and examples are possible.

After either block 1714 or block 1716, the method may proceed to block 1718. At block 1718, the clock cycle Z may be incremented to Z+1, and the method may return to blocks 1704, 1706, 1708, and 1710. Other variations are possible.

Figure 18:
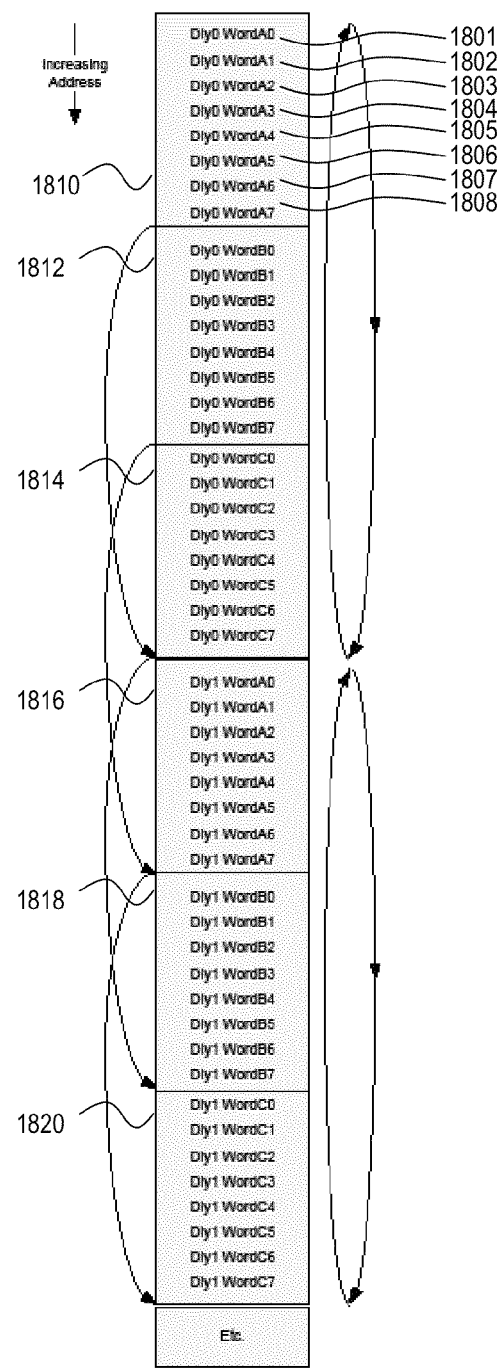
FIG. 18 is a flow diagram of an example operation of a portion of an electronic device.

FIG. 18 shows an example of the operation of a system having two or more delay lines with sets of write buffers A 462, B 464, and C 466. Samples, such as sample 1801-1808, may represent a first sample block or sample burst 1810 of 8 samples. The sample burst 1810 may represent a first buffer A 462 of a first write buffer component 460 for a first delay line. A next set of samples, such as sample burst 1812, may represent buffer B 464 of the first write buffer component 460 which is written during a next clock cycle. In a third cycle, the sample burst 1814 may represent buffer C 466 of the write buffer component 460 that was written during the third cycle.

A next set of A samples, such as sample burst 1816, may represent the data of the first buffer A of a second write buffer component 460. This process may be repeated with a second set of B samples (sample burst 1818), and second set of C samples (sample set 1820). Additional delay lines or write buffer components 460 may be included in the electronic device 420, and sample sets or batches may be written into these in the same or a different manner. 11

In some instances, all of the A sample bursts may be written to the write buffers of the first, second, and subsequent write buffer components in a first clock cycle, before the B or C sample bursts are written. For example, in a first clock cycle, the first set of A samples 1810 may represent the data written to the buffer A 462 of the first write buffer component, by the sample processing component 435 after which the second set of A samples 1816 may represent data written into the first buffer of the write buffer component by the sample processing component 435. In this way, the system may leap over the buffers B and C of the first write buffer component in writing the samples to the buffer. In the next clock cycle, after writing the A samples in the previous clock cycle, the B samples 1812 and 1818 may be written to the first and second write buffer components. In a third clock cycle, the C samples 1814 and 1820 may be written to the first and second write buffers components. Other variations are possible.

One or more of the electronic devices 102 or 402, core processors 130 or 430, or memory access control units 480 may be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. One or more of the electronic devices 102 or 402, core processors 130 or 430, or memory access control units 480 may be implemented using electronic devices that provide voice, audio, video or data communication. While a single electronic device 102 and 402 is illustrated, the terms "device" or "system" may include any collection of systems or sub-systems that individually or jointly execute a set, or multiple sets, of instructions to perform one or more computer functions.

The term "module" may be defined to include a number of executable modules. The modules may include software, hardware or some combination thereof executable by a processor, such as the core processor 130 or 430. Software modules may include instructions stored in compute readable medium or memory, such as memory 148 or external memory 110, or another memory device, that may be executable by the processors 130 or 430. Hardware modules may include various devices, components, circuits, gates, circuit boards, and the like that are executable, directed, and/or controlled for performance by the processors 130 or 430.

The memory that may be included with the one or more of the electronic devices 102 or 402, core processors 130 or 430, or memory access control units 480 may be a main memory, a static memory, or a dynamic memory. The memory may include, but is not limited to computer readable medium or computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory includes a cache or random access memory for a processor, such as processor 130 or 430. In alternative examples, the memory may be separate from a processor, such as a cache memory of a processor, the system memory, or other memory. The memory may be non-transitory, tangible, or both non-transitory and tangible. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described may be performed by a programmed processor, such as processor 130 or 430, executing the instructions stored in the memory. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The memory may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The electronic devices 102 and 402 may encompass software, firmware, and hardware implementations.

While the above described methods and systems may refer to a comparison and/or determination as to whether one element (such as a delay index) is greater than a second element (such as a threshold value), in some embodiments one or more of these comparisons may be replaced by a comparison and/or determination as to whether one element is greater than or equal to a second element. Similarly, comparisons and/or determinations described as being "greater than" may also be replaced with "greater than or equal to." While the above described methods may refer to a comparison and/or determination as to whether one element is less than or equal to a second element, in some embodiments one or more of these comparisons may be replaced by a comparison and/or determination as to whether one element is less than a second element. Similarly, comparisons and/or determinations described as being "less than" may also be replaced with "less than or equal to." Comparisons and/or determinations made which require an element to "exceed" a second element may be replaced by comparisons and/or determinations which require an element to "exceed or equal" a second element, and vice versa.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A memory access system, comprising:
   a write buffer component in communication with a processor and a memory separate from the processor, the write buffer component configured to receive first data from the processor and transmit the first data to the memory; and
   a read buffer component in communication with the processor and the memory, the read buffer component configured to gather second data from the memory to transmit the second data to the processor;
   where the write buffer is configured to bypass the memory and to transmit the first data to the processor when a condition specifying a maximum amount of delay index before the memory is utilized is satisfied by a delay index of the first data.

2. The memory access system of claim 1, where the condition is satisfied when the delay index of the first data is less than a threshold value minus one.

3. The memory access system of claim 2, where the threshold value corresponds to twice a predetermined size of the first data.

4. The memory access system of claim 1, where the first data comprises:
   a first set of samples processed by the processor during a first clock cycle;
   a second set of samples processed by the processor during a second clock cycle after the first clock cycle; and
   a third set of samples processed by the processor during a third clock cycle after the second clock cycle.

5. The memory access system of claim 4, where the write buffer component comprises a first buffer, a second buffer, and a third buffer; and
   where the write buffer component is configured to write the first set of samples to the first buffer, the second set of samples to the second buffer, and the third set of samples to the third buffer.

6. The memory access system of claim 5, where the first data comprises a fourth set of samples processed by the processor during a fourth clock cycle after the third clock cycle, and where the write buffer component is configured to write the fourth set of samples to the first buffer.

7. A method of accessing data, comprising:
   storing data from a first processing component in a write buffer component;
   writing the data from the write buffer component to a memory separate from the first processing component;
   gathering the data from the memory with a read buffer component;
   accessing the data for use with a second processing component using the write buffer component when a first condition specifying a maximum amount of delay index before the memory is utilized is satisfied by a delay index for the data, the second processing component being separate from the first processing component and the memory; and
   accessing the data for use with the second processing component using the read buffer component when the condition is not satisfied.

8. The method of claim 7, further comprising:
   satisfying the condition when delay index for the data is not greater than a threshold value.

9. The method of claim 8, where the data comprises a set of samples, and where the threshold value is equal to twice a size of the set of samples minus one.

10. The method of claim 7, further comprising storing the data from the first processing component in the write buffer component at least one clock cycle before the data is written from the write buffer component to memory separate from the first processing component.

11. The method of claim 7, further comprising determining, during each clock cycle, when the condition is satisfied.

12. The method of claim 11, where the data for use with the second processing component is accessed during each clock cycle according to the determination.

13. An electronic device, comprising:
a processing component;
a memory separate from the processing component; and
a memory access component in communication with the processing component and the memory, the memory access component including: a write buffer component configured to receive first data from the processing component and to transmit the first data to the memory; and a read buffer component configured to gather second data from the memory to transmit the second data to the processing component; and
where the processing component is configured to receive the first data from the write buffer when a condition specifying a maximum amount of delay index before the memory is utilized is satisfied by a delay index for the first data, and where the processing component is configured to receive the second data from the read buffer when the condition is not satisfied.

14. The electronic device of claim 13, where the write buffer component is configured to receive the first data and the read buffer component gathers the second data during each clock cycle.

15. The electronic device of claim 14, further comprising a memory access control component configured to determine when the condition is satisfied.

16. The electronic device of claim 15, where the memory access control component determines when the condition is satisfied during each clock cycle.

17. The electronic device of claim 14, where the write buffer component comprises a first write buffer configured to receive the first data during a first clock cycle, a second write buffer configured to receive the first data during a second clock cycle after the first clock cycle, and a third write buffer configured to receive the first data during a third clock cycle after the second clock cycle.

18. The electronic device of claim 17, where the first write buffer is configured to receive fourth data during a fourth clock cycle after the third clock cycle.

19. The electronic device of claim 13, where the first data and the second data are a substantially the same size, and where the condition is satisfied when a delay index for the first data is less than twice the size minus one.

20. The electronic device of claim 13, where the write buffer component is configured to receive the first data from a sample processing component of the processing component; and
where a main processing component of the processing component receives the first data from the write buffer in response to satisfaction of the condition, and receives the second data from the read buffer when the condition is not satisfied.

* * * * *